United States Patent
Sakata

(10) Patent No.: US 11,186,233 B2
(45) Date of Patent: Nov. 30, 2021

(54) ELECTRIC RETRACTABLE VEHICLE PERIPHERY VIEWING DEVICE

(71) Applicant: Ichikoh Industries, Ltd., Isehara (JP)

(72) Inventor: Ikuo Sakata, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 16/635,853

(22) PCT Filed: Aug. 1, 2018

(86) PCT No.: PCT/JP2018/028855
§ 371 (c)(1),
(2) Date: Jan. 31, 2020

(87) PCT Pub. No.: WO2019/026959
PCT Pub. Date: Feb. 7, 2019

(65) Prior Publication Data
US 2021/0024011 A1    Jan. 28, 2021

(30) Foreign Application Priority Data

Aug. 2, 2017 (JP) .............................. JP2017-149747

(51) Int. Cl.
*B60R 11/04* (2006.01)
*B60R 1/00* (2006.01)
(Continued)

(52) U.S. Cl.
CPC ............... *B60R 11/04* (2013.01); *B60R 1/00* (2013.01); *H04N 5/2253* (2013.01);
(Continued)

(58) Field of Classification Search
USPC ...................................................... 348/148
See application file for complete search history.

(56) References Cited

U.S. PATENT DOCUMENTS 4,786,157 A    11/1988   Mori et al.
2015/0156383 A1*   6/2015   Biemer ................ G02B 26/005
                                                       348/148
(Continued)

FOREIGN PATENT DOCUMENTS

JP         62-283030 A    12/1987
JP         63-87338 A      4/1988
(Continued)

OTHER PUBLICATIONS

Supplementary European Search Report dated Nov. 25, 2020 in European Patent Application No. 18841526.9, citing documents AA and AO-AR therein, 1 page.
International Search Report dated Oct. 9, 2018 in PCT/JP2018/028855 filed Aug. 1, 2018, citing document AP therein, 1 page.

*Primary Examiner* — Behrooz M Senfi
(74) *Attorney, Agent, or Firm* — Oblon, McClelland, Maier & Neustadt, L.L.P.

(57) ABSTRACT

To provide an electric retractable vehicle periphery viewing device, that can improve fuel efficiency due to air resistance and that can prevent a damage or the like in the event of a collision of an obstacle when the device is in use, the electric retractable vehicle periphery viewing device of the present invention includes a base (2), a shaft (3) and a viewing assembly (4). The viewing assembly (4) includes a housing (4U), (4D), a viewing unit (5), and an electric retracting unit (6). The electric retracting unit (6) includes a casing (6U), (6D), a motor (7M), a speed reduction mechanism (7), a clutch mechanism (8), and a rotational force transmission mechanism (9). The motor (7M), the speed reduction mechanism (7), the clutch mechanism (8), and the rotational force transmission mechanism (9) are arranged in a direction intersecting with an axial direction of the shaft (3).

6 Claims, 18 Drawing Sheets

(51) Int. Cl.
*H04N 5/225* (2006.01)
*B60R 11/02* (2006.01)
*B60R 11/00* (2006.01)
*F16D 21/00* (2006.01)

(52) U.S. Cl.
CPC ... *B60R 11/0229* (2013.01); *B60R 2011/0003* (2013.01); *B60R 2011/004* (2013.01); *B60R 2011/0082* (2013.01); *B60R 2011/0085* (2013.01); *B60R 2011/0092* (2013.01); *B60R 2300/8046* (2013.01); *F16D 21/00* (2013.01)

(56) References Cited

U.S. PATENT DOCUMENTS

| | | | | |
|---|---|---|---|---|
| 2016/0137126 | A1* | 5/2016 | Fursich | B60R 1/00 348/38 |
| 2018/0281683 | A1* | 10/2018 | Motomiya | B60R 1/076 |
| 2019/0279008 | A1* | 9/2019 | Abhau | G06T 15/04 |

FOREIGN PATENT DOCUMENTS

| | | | |
|---|---|---|---|
| JP | 63-195041 | A | 8/1988 |
| JP | 64-1642 | A | 1/1989 |
| JP | 8-164796 | A | 6/1996 |
| JP | 2017-39377 | A | 2/2017 |

* cited by examiner

ELECTRIC RETRACTABLE VEHICLE PERIPHERY VIEWING DEVICE

TECHNICAL FIELD

The present invention relates to an electric retractable vehicle periphery viewing device.

BACKGROUND ART

An electric retractable vehicle periphery viewing device is described, for example, in Patent Literatures 1 and 2. A camera unit of a vehicle image display of Patent Literature 1 includes a side camera, a retraction motor, a camera switching motor, a base member, and a support member. The camera unit of the vehicle image display of Patent Literature 1 is disposed by the base member on each of right and left side portions of a vehicle, and a backward image from the side of the vehicle is captured by the side camera and thus is obtained as an alternative for a side mirror.

An electric tiltable door mirror of Patent Literature 2 includes a mirror base to which a main gear is fixed, and a bracket on which a first shaft and a second shaft are arranged. A pinion gear engageable with the main gear is attached to the second shaft, and the pinion gear is connected to a motor via a clutch plate, a spur gear, and a reduction gear group that are coaxial with the pinion gear. The electric tiltable door mirror of Patent Literature 2 is structured such that the bracket is tiltable in a front to back direction of a vehicle body with respect to the mirror base fixed to a front door of an automobile.

CITATION LIST

Patent Literature

PTL1: Japanese Unexamined Patent Application Publication No. 2017-39377
PTL2: Japanese Unexamined Patent Application Publication No. H8-164796

SUMMARY OF THE INVENTION

Problems to be Solved by the Invention

The camera unit of the vehicle image display of Patent Literature 1 can be reduced in size compared with a side mirror. Therefore, the aerodynamic performance of the automobile can be improved, and the weight of the automobile can be reduced. Consequently, the fuel efficiency of the automobile can be improved. In addition, when the camera unit of the vehicle image display of Patent Literature 1 is not in use, the support member can be retracted with respect to the base member; therefore, a damage or the like of the camera unit can be prevented. However, when the camera unit of the vehicle image display of Patent Literature 1 is in a usage state where the support member protrudes from the side of the vehicle with respect to the base member, an obstacle is brought into collision with the support member from the front or back side with a load greater than a rotational force transmitted from the retraction motor. In such a case, a mechanism to rotate the support member forward and backward for buffering is not provided. Therefore, in a case where an obstacle is brought into collision with the support member from the front or back side when the camera unit of the vehicle image display of Patent Literature 1 is in use, a damage or the like of the camera unit may not be prevented.

The electric tiltable door mirror of Patent Literature 2 is structured such that when a cut section 49 attached on a top surface of a main gear 23 is not in contact with a conductive pattern 50 wired on a back surface of a bracket 24, a circuit is opened to cut off current supply. Thus, in the electric tiltable door mirror of Patent Literature 2, backlash between gears (backlash between the main gear 23 and a pinion gear 33, backlash between a spur gear 36 and a spur gear 43 of a double gear 45, backlash between a spur gear 44 of the double gear 45 and a worm gear 47) may occur. In addition, all of the shaft fitting clearance between a second shaft 32 and the pinion gear 33 and the shaft fitting clearance between a third shaft 42 and the double gear 45 may remain as backlash in the rotation direction of the main gear 23. Moreover, the electric tiltable door mirror of Patent Literature 2 is structured such that a spring of a first shaft 25 is removed; therefore, there may be backlash in the up-down direction. As a result, when the automobile is in a normal driving state, the electric tiltable door mirror of Patent Literature 2 cannot ensure backward visibility because of backlash in the rotation direction and backlash in the up-down direction.

In order to solve the problems, an object of the present invention is to provide an electric retractable vehicle periphery viewing device that can improve fuel efficiency clue to air resistance and can prevent a damage or the like in the event of a collision of an obstacle when the device is in use, and that can minimize vibration in order to ensure backward visibility during travelling.

Means for Solving the Problem

An electric retractable vehicle periphery viewing device, according to an aspect of the present invention includes: a base fixed to a vehicle body; a shaft fixed to the base; and a viewing assembly rotatably attached to the shaft; wherein the viewing assembly includes: a housing; a viewing unit mounted in the housing; and an electric retracting unit housed in the housing and configured to rotate the viewing assembly, wherein the electric retracting unit includes: the shaft; a casing rotatably attached to the shaft and fixed in the housing; a motor and a speed reduction mechanism that are attached to the casing; a clutch mechanism attached to the casing, the clutch mechanism being in a connected state when in a normal case, to transmit a rotational force of the motor via the speed reduction mechanism to the casing, the clutch mechanism being in a disconnected state when force greater than the rotational force transmitted from the motor is applied to the viewing assembly, to rotate the viewing assembly without transmitting, to the speed reduction mechanism, the force greater than rotational force transmitted from the motor; and a rotational force transmission mechanism attached to the shaft and configured to transmit rotational force of the motor via the speed reduction mechanism and the clutch mechanism to the casing and to rotate the viewing assembly between a use position and a backward retracted position, wherein the motor, the speed reduction mechanism, a portion of the clutch mechanism, and the rotational force transmission mechanism are housed in the casing, and wherein the motor, the speed reduction mechanism, the clutch mechanism, and the rotational force transmission mechanism are disposed in a direction intersecting with an axial direction of the shaft.

In the electric retractable vehicle periphery viewing device according to an aspect of the present invention, the rotational force transmission mechanism may include: a first lift member rotatably attached to the shaft; a second lift member, attached to the shaft, not rotatably but movably in the axial direction of the shaft; and anti-backlash portions respectively disposed on the first lift member and the second lift member, the anti-backlash portions configured to, when the viewing assembly is located at the use position or the backward retracted position, disperse force in a rotation direction due to the rotational force of the motor applied to the first lift member, toward the axial direction of the shaft and the rotation direction, and to stop backlash in the axial direction of the shaft and backlash in the rotation direction.

In the electric retractable vehicle periphery viewing device according to an aspect of the present invention, a stopper formed of a plate spring is fixed near the shaft in the casing, each of the shaft and the stopper is provided with a positioning portion thereof, when the viewing assembly rotated from the backward retracted position is located at the use position, the positioning portion makes contact with each other and stop the viewing assembly at the use position, and when the viewing assembly is rotated forward from the use position, the positioning portion of the stopper is deformed in the axial direction of the shaft to be disconnected from the positioning portion of the shaft and allows the viewing assembly to rotate forward.

In the electric retractable vehicle periphery viewing device according to an aspect of the present invention, the clutch mechanism may include: a clutch shaft having a center line parallel to the shaft, the clutch shaft being attached, to the casing, not rotatably around the center line but movably in a direction of the center line; a clutch spring, outside the casing, attached to the clutch shaft and the casing; and a first clutch and a second clutch that are attached to the clutch shaft, the first clutch and the second clutch being in a connected state by spring force of the clutch spring when in a normal case, the first clutch and the second clutch being in a disconnected state against spring force of the clutch spring when an external force greater than rotational force transmitted from the motor is applied to the viewing assembly.

The electric retractable vehicle periphery viewing device according to an aspect of the present invention may be structured such that the viewing unit is an imaging device configured to capture an image around a vehicle.

The electric retractable vehicle periphery viewing device according to an aspect of the present invention may include a display mounted in a vehicle and display an image, captured by the imaging device, around a vehicle.

Effect of the Invention

The electric retractable vehicle periphery viewing device of the present invention can improve fuel efficiency due to air resistance and can prevent a damage or the like in the event of a collision of an obstacle when the device is in use. In addition, the electric retractable vehicle periphery viewing device can minimize vibration during travelling.

BRIEF DESCRIPTION OF THE DRAWINGS

FIG. 2A is a plan view illustrating a use position, a backward retracted position, and a forward retracted position of the left electric retractable vehicle periphery viewing device, and FIG. 2B is a front view (viewed from the direction indicated by IIB arrow in FIG. 2A) illustrating the use position of the left electric retractable vehicle periphery viewing device.

FIG. 11A is a partial transverse cross-sectional view when a viewing assembly is located at the use position, FIG. 11B is a partial transverse cross-sectional view when the viewing assembly is located at the backward retracted position, and FIG. 11C is a partial transverse cross-sectional view when the viewing assembly is located at the forward retracted position.

FIG. 12A is a partial transverse cross-sectional view when the viewing assembly is located at the use position, FIG. 12B is a partial transverse cross-sectional view when the viewing assembly is located at the backward retracted position, and FIG. 12C is a partial transverse cross-sectional view when the viewing assembly is located at the forward retracted position.

FIG. 13A is a partial transverse cross-sectional view when a viewing assembly is located at the use position, FIG. 13B is a partial transverse cross-sectional view when the viewing assembly is rotating from the use position to the backward retracted position, and FIG. 13C is a partial transverse cross-sectional view when the viewing assembly is located at the backward retracted position.

FIG. 14A is a partial transverse cross-sectional view when a viewing assembly is located at the use position, FIG. 14B is a partial transverse cross-sectional view when the viewing assembly is rotating by an external action from the use position to the backward retracted position, and FIG. 14C is a partial transverse cross-sectional view when the viewing assembly is located by an external action at the backward retracted position.

FIG. 15A is a partial transverse cross-sectional view when a viewing assembly is located at the use position, FIG. 15B is a partial transverse cross-sectional view when the viewing assembly is rotating by an external action from the use position to the forward retracted position, and FIG. 15C is a partial transverse cross-sectional view when the viewing assembly is located by an external action at the forward retracted position.

MODE FOR CARRYING OUT THE INVENTION

Figure 1:
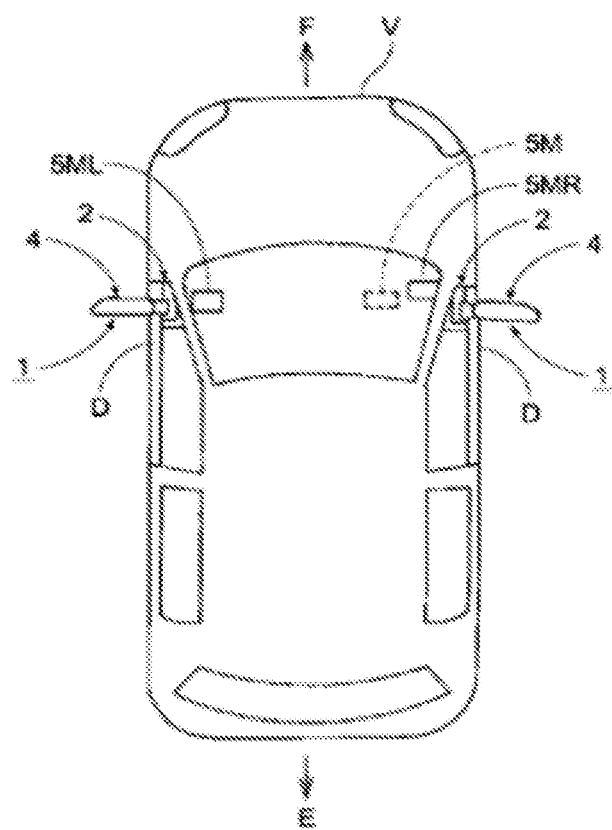
FIG. 1 is a plan view illustrating an electric retractable vehicle periphery viewing device in use according to a first embodiment of the present invention.
Figure 2:
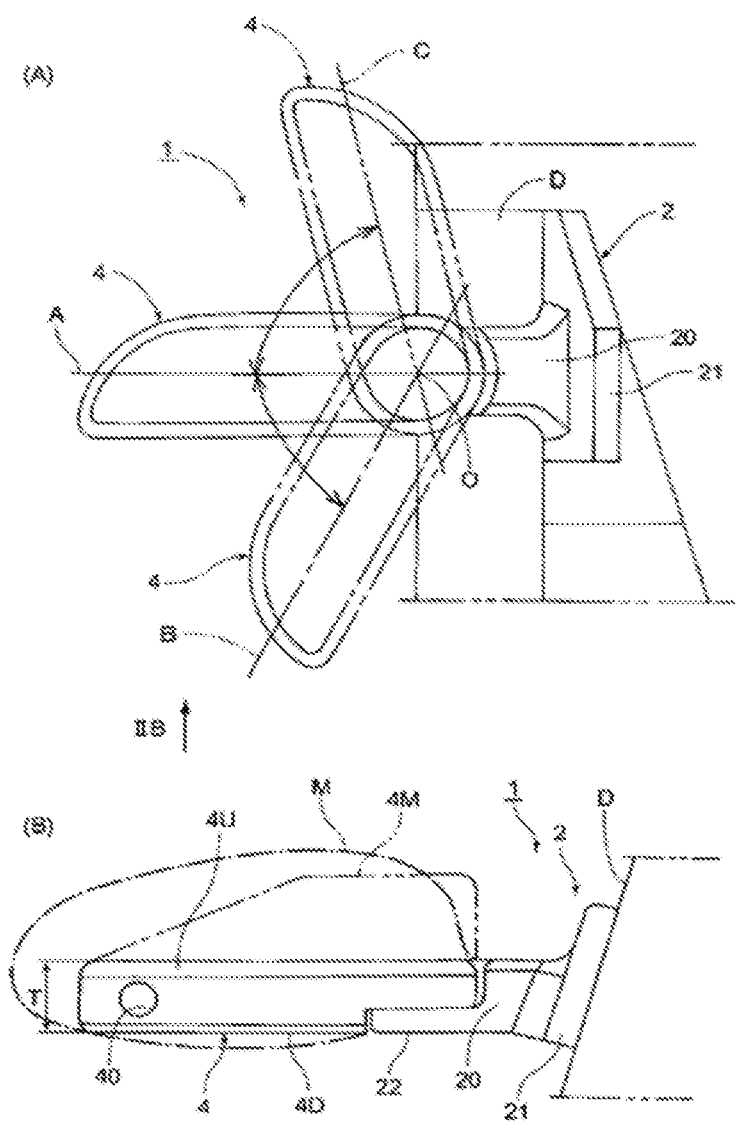
FIG. 2 is an explanatory diagram illustrating a usage state of an electric retractable vehicle periphery viewing device mounted on a left door of a vehicle.
Figure 3:
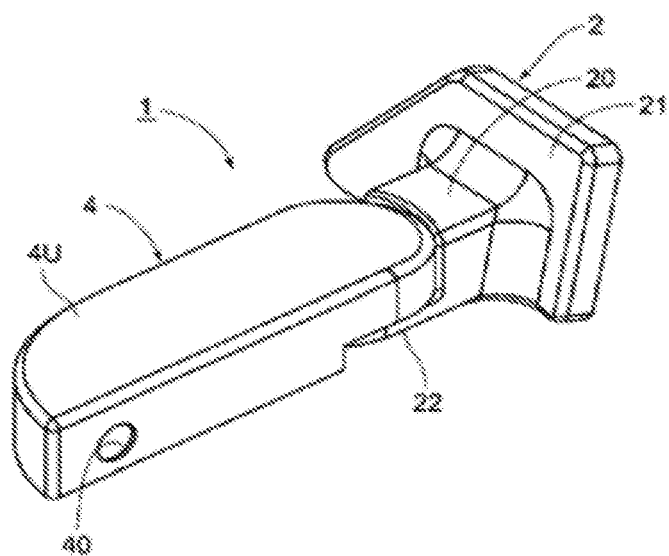
FIG. 3 is a perspective view illustrating a left electric retractable vehicle periphery viewing device.

Hereinafter, an electric retractable vehicle periphery viewing device according to three examples of embodiments (practical examples) of the present invention will be described in detail based on the drawings. The front, back, upper, lower, left, and right in the specification and the appended claim coincide with the front, back, upper, lower, left, and right when the electric retractable vehicle periphery viewing device, according to the present invention is mounted on a vehicle. Further, as schematically illustrated in the drawings, main components are illustrated and components other than the main components are omitted from the drawings, and hatching is partially omitted.

(Description of Configuration of First Embodiment)
FIGS. 1 to 16 illustrate an electric retractable vehicle periphery viewing device, according to a first embodiment of the present invention. Herein, the configuration of the electric retractable vehicle periphery viewing device, according to the first embodiment will be described.

(Description of Electric Retractable Vehicle Periphery Viewing Device 1)
In the drawings, the electric retractable vehicle periphery viewing device, according to the first embodiment (hereinafter, simply referred to as a "viewing device") is indicated by reference numeral 1. As illustrated in FIG. 1, viewing devices 1 are mounted on right and left doors (vehicle bodies) D of a vehicle (an automobile) V. The viewing devices 1 are alternatives for vehicle rearview mirrors, for example, outside mirror devices M (see the single dotted line in FIG. 2B) such as door mirror devices mounted on the right and left doors D of the vehicle. For example, the electric tiltable door mirror of Patent Literature 2 or the like is known as the outside mirror device M. Herein, the viewing device 1 mounted on the left door D of the vehicle V will be described. Note that the viewing device 1 mounted on the right door D of the vehicle V is configured substantially in the same manner as the viewing device 1 mounted on the left door D of the vehicle V, and thus the description of the viewing device 1 mounted on the right door D will be omitted.

As illustrated in FIGS. 1 to 5, the viewing device 1 includes a base 2, a shaft 3, a viewing assembly 4, and a display (monitor) 5M, 5ML, 5MR. The base 2, the shaft 3, and the viewing assembly 4 are mounted on the door D. The display 5M, 5ML, 5MR is mounted in a cabin of the vehicle V (inside the vehicle). In other words, the left display (monitor) 5ML is mounted close to the left viewing assembly 4. The right display (monitor) 5ML is mounted close to the right viewing assembly 4. The center display (monitor) 5M is mounted close to a driver's seat. Note that at least one of the left display (monitor) 5ML, the right display (monitor) 5ML, and the center display (monitor) 5M may be mounted. In FIG. 2A, a use position of the viewing assembly 4 is indicated by symbol A. A backward retracted position of the viewing assembly 4 is indicated by symbol B. A forward retracted position of the viewing assembly 4 is indicated by symbol C. The back side of the vehicle V is indicated by symbol E. The front side of the vehicle V is indicated by symbol F. A rotation center line of the viewing assembly 4 is indicated by symbol O and is a center line of a shaft portion 30 of the shaft 3. The rotation center line will be hereinafter referred to as a "rotation center line O".

(Description of Base 2)
As illustrated in FIGS. 2 to 5, the base 2 includes a rectangular parallelepiped neck portion 20, a vertical plate-shaped first fixation portion 21, and a second horizontal plate-shaped fixation portion 22. The neck portion 20, the first fixation portion 21, and the second fixation portion 22 form a hollow integrated structure. The first fixation portion 21 is fixed to the vehicle body, i.e., the door D in the embodiment by a screw or the like (not illustrated). The inside of the base 2 is communicated with the inside of the vehicle V through an opening (not illustrated) provided in a vehicle body panel of the door D or in a door panel.

A circular through-hole 23 is provided in an upper wall of the second fixation portion 22. Plural bosses, i.e., three bosses 24 in the embodiment are integrally provided on an inner surface of a lower wall of the second fixation portion 22. Plural screws, i.e., three screws 25 in the embodiment are fixed to the bosses 24.

(Description of Shaft 3)
As illustrated in FIGS. 5 to 12, the shaft 3 includes a hollow cylindrical shaft portion 30 and a disk-shaped disk portion 31. A circular through-hole is provided in the center of the disk portion 31. A lower end of the shaft portion 30 is integrally disposed in the center on an upper surface of the disk portion 31. The hollow portion of the shaft portion 30 is communicated with the through-hole of the disk portion 31.

A substantially octagonal engagement portion 32 and a circular locking groove 33 are provided on an upper end portion of the shaft portion 30 in a circumferential direction of the shaft portion 30. The engagement portion 32 is located on the disk portion 31 side with respect to the locking groove 33. In FIGS. 5 to 12, the engagement portion 32 has an octagonal shape (polygonal shape) but may have serration or spline engagement.

One rotation restriction projection 34 and plural positioning projections, i.e., two positioning projections 35 as positioning portions in the embodiment are provided on the upper surface of the disk portion 31 in a circumferential direction of the disk portion 31, i.e., in an arc shape around the rotation center line O. The rotation restriction projection 34 restricts a rotation range (rotation angle) of the viewing assembly 4 to a range (an angle) between a backward retracted position B and a forward retracted position C. The rotation restriction projection 34 is disposed on a circumferential rim of the disk portion 31. A side surface of the rotation restriction projection 34 has a vertical surface or a substantially vertical surface. The two positioning projections 35 allow the viewing assembly 4 rotated from the backward retracted position B toward the use position A to stop at the use position A. The two positioning projections 35 are provided on the shaft portion 30 side with respect to the rotation restriction projection 34. Of side surfaces of each of the two positioning projections 35, the right side surface (see FIG. 12) that is a side surface located at least on the positioning side is inclined to expand from the upper side to the lower side.

Plurality bosses, i.e., three bosses 36 in the embodiment are integrally disposed on a lower surface of the disk portion 31. The disk portion 31 is fitted into the through-hole 23 of the base 2, and the three screws 25 are screwed into the bosses 36 through the bosses 24 of the base 2. As a result, the shaft 3 is fixed to the base 2.

(Description of Viewing Assembly 4)

As illustrated in FIGS. 1 to 5, the viewing assembly 4 is rotatably attached to the shaft portion 30 of the shaft 3. The viewing assembly 4 includes housing 4U, 4D, a viewing unit 5, and an electric retracting unit 6.

(Description of Housing 4U, 4D)

As illustrated in FIGS. 2 to 5, the housing 4U, 4D has a hollow, thin box shape. A lower portion of one end of the housing 4U, 4D is recessed to be fitted to the second fixation portion 22 of the base 2. As a result, an upper surface of the housing 4U, 4D is substantially flush with an upper surface of the neck portion 20 of the base 2, and in addition, a lower surface of the housing 4U, 4D, excluding one end thereof is substantially flush with a lower surface of the second fixation portion 22 of the base 2.

The housing 4U, 4D includes an upper housing (garnish) 4U and a lower housing 4D. A lower surface of the upper housing 4U is opened, and an upper surface of the lower housing 4D is opened. Side walls of the upper housing 4U are closely fitted to side walls of the lower housing 4D from the outside, or they are fixed to each other by such as adhesion, welding.

Figure 5:
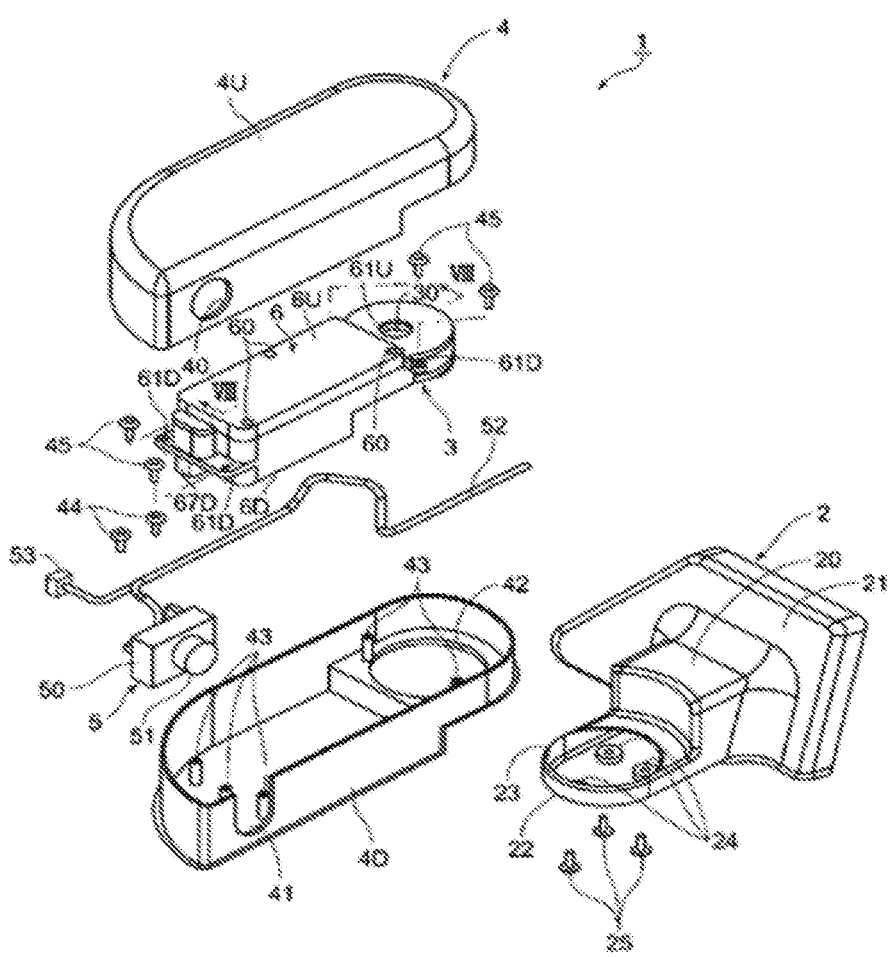
FIG. 5 is an exploded perspective view illustrating components of a left electric retractable vehicle periphery viewing device.

A circular through-hole 40 is provided in a back side of the side surface at the other end of the upper housing 4U. An opening 41 with a square top shape on a round base shape is provided in a back side of the side surface at the other end of the lower housing 4D. A lower wall of one end of the lower housing 4D is recessed upward. A circular through-hole 42 is provided in the upward-recessed lower wall corresponding to the through-hole 23 of the base 2. The shaft 3 is fixed through the through-hole 42 of the lower housing 4D and the through-hole 23 of the base 2 to the base 2. In other words, the disk portion 31 of the shaft 3 is disposed to extend through the through-hole 42 of the lower housing 4D and the through-hole 23 of the base 2. Plural bosses, i.e., six bosses 43 in the embodiment are integrally provided on an upper surface of the lower wall of the lower housing 4D. Note that the five bosses 43 are illustrated in FIG. 5.

(Description of Viewing Unit 5)

Figure 4:
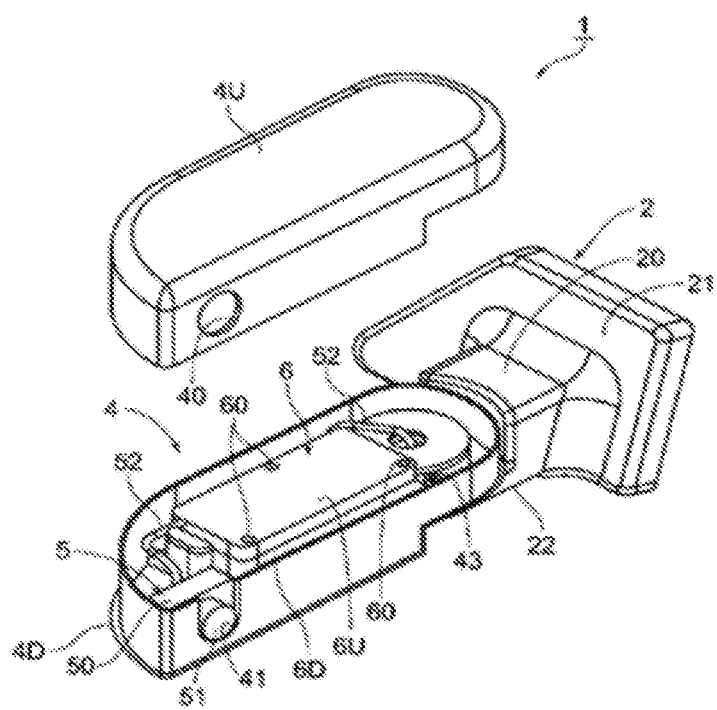
FIG. 4 is a perspective view illustrating a state where an upper housing (a garnish) is removed from a left electric retractable vehicle periphery viewing device.

In the embodiment, the viewing unit 5 is an imaging device (camera) configured to capture information around the vehicle V as an image. As illustrated in FIGS. 4 and 5, the viewing unit 5 includes a body 50, a lens 51, and a harness 52. The viewing unit 5 is housed in the housing 4U, 4D. The body 50 is fixed to the two bosses 43 of the lower housing 4D by plural screws, i.e., two screws 44 in the embodiment. The lens 51 faces the opening 41 of the lower housing 4D and the through-hole 40 of the upper housing 4U. The harness 52 is connected to the body 50. The harness 52 is arranged to extend from the inside of the housing 4U, 4D through the shaft 3 and the base 2 to the inside of the vehicle V. The harness 52 is provided with a connector 53 electrically connectable to the electric retracting unit 6.

To capture a visual range equal to or wider than a visual range of the lateral side and the back side of the vehicle V of the existing outside mirror device M (see the alternate long and short dash line in FIG. 2B) with the use of the viewing unit 5, the viewing unit 5 needs to be positioned to protrude outward from the door D. Therefore, when the viewing assembly 4 is located at the use position A, the housing 4U, 4D in which the viewing unit 5 is housed is protruded outward from the door D. Note that in the embodiment, as illustrated in FIG. 2B, the amount of protrusion of the housing 4U, 4D is smaller than the amount of protrusion of the existing outside mirror device M.

Figure 16:
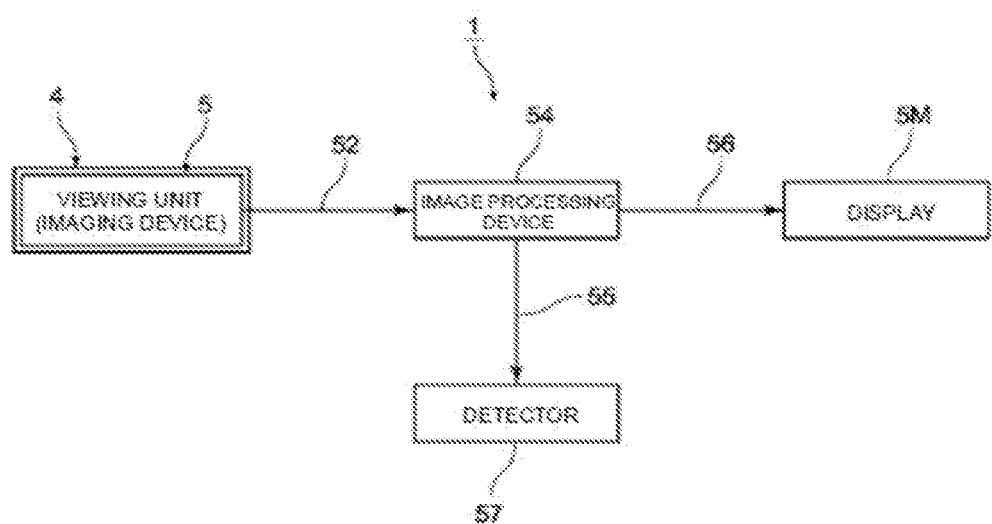
FIG. 16 is a block diagram illustrating the overall configuration.

As illustrated in FIG. 16, the viewing unit 5 is connected via the harness 52 to an image processing device (image processing ECU) 54. The image processing device 54 is connected via a signal line 55 to a detector 57 and is connected via a signal line 56 to a display 5M.

The viewing unit 5 as the imaging device is configured to capture information around the vehicle V, i.e., on the back side and the lateral side of the vehicle V, as images, and to output the images of the information on the back side and the lateral side of the vehicle V via the harness 52 to the image processing device 54.

The detector 57 is mounted in the vehicle V. The detector 57 is connected via the signal line 55 to the image processing device 54. The detector 57 is configured to detect vehicle information and to output the detected vehicle information as a detection signal via the signal line 55 to the image processing device 54. For example, the detector 57 is at least one of a steering angle detection unit (steering angle sensor), a gear position detection unit (gear position sensor), a direction instruction detection unit (direction instruction sensor), a vehicle speed detection unit (vehicle speed sensor), a vehicle position detection unit (vehicle position sensor), an ultrasonic detection unit (ultrasonic sensor), and other detection units.

The image processing device 54 is mounted in the vehicle V. The image processing device 54 is connected via the harness 52 to the viewing unit 5, connected via the signal line 55 to the detector 57, and connected via the signal line 56 to the display 5M. The image processing device 54 is configured to appropriately process the images, captured by the viewing unit 5, of the information on the back side and the lateral side of the vehicle V in accordance with the vehicle information from the detector 57. Note that the image processing device 54 may process the images, captured by the viewing unit 5, of the information on the back side and the lateral side of the vehicle V based on not the vehicle information from the detector 57 but a manual operation by a driver. The image processing device 54 outputs the processed images to the display 5M.

The display 5M is mounted in a visual range of a driver in the cabin of the vehicle V (inside the vehicle). The display 5M is connected via the signal line 56 to the image processing device 54. The display 5M is configured to display an image processed by the image processing device 54. The driver visually recognizes the image displayed by the display 5M and thereby can visually recognize the back side and the lateral side of the vehicle V.

(Description of Electric Retracting Unit 6)

As illustrated in FIGS. 4 to 10, the electric retracting unit 6 is housed in the housing 4U, 4D and is configured to rotate the viewing assembly 4. The electric retracting unit 6 includes the shaft 3, a casing 6U, 6D, a motor 7M, a speed reduction mechanism 7, a clutch mechanism 8, and a rotational force transmission mechanism 9.

The motor 7M, the speed reduction mechanism 7, a portion of the clutch mechanism 8, and the rotational force transmission mechanism 9 are housed in the casing 6U, 6D. The motor 7M, the speed reduction mechanism 7, the clutch mechanism 8, and the rotational force transmission mechanism 9 are arranged in a direction intersecting with (orthogonal to or substantially orthogonal to) an axial direction of the shaft 3 (the rotation center line O).

(Description of Casing 6U, 6D)

As illustrated in FIGS. 4 to 9, the casing 6U, 6D is rotatably attached to the shaft 3 and is fixed to the four bosses 43 of the lower housing 4D with plural screws, i.e., four screws 45 in the embodiment. The casing 6U, 6D includes an upper casing (a cover) GU and a lower casing (gear case) 6D. The upper casing 6U has a substantially plate-shape. The lower casing 6D has a hollow, thin box shape with an upper surface opened. The upper casing 6U and the lower casing 6D are fixed to each other with plural screws, i.e., three screws 60 in the embodiment in a state where the upper casing 6U is closely fitted to an opening of the upper surface of the lower casing 6D.

Three through-holes 60U through which the three screws 60 extend are provided in the upper casing 6U. One end of the upper casing 6U is recessed downward. A first cylindrical portion 61U is integrally formed on a lower surface of the downward-recessed one end of the upper casing 6U. The first cylindrical portion 61U is disposed rotatably around the rotation center line O to extend through an upper end portion of the shaft portion 30 of the shaft 3. The harness 52 is disposed to extend through the first cylindrical portion 61U and the shaft portion 30 of the shaft 3. A second cylindrical portion 62U, a first bearing portion 63U, and second bearing portions 64U are integrally formed on the lower surface of the upper casing GU.

Three holes 60D with which the three screws 60 are screwed and four through-holes 61D through which the four screws 45 extend are disposed in the lower casing 6D. A portion from the center to one end of the lower casing 6D is recessed upward. A cylindrical portion 62D is integrally disposed on a lower surface of one end of the lower casing 6D. The cylindrical portion 62D is fitted via a bush 61 from the outer side to a lower end portion of the shaft portion 30 of the shaft 3 to rotate around the rotation center line O.

On an upper surface of the other end of the lower casing 6D, a first bearing portion 63D and second bearing portions 64D are integrally disposed corresponding to the first bearing portion 63U and the second bearing portions 64U of the upper casing 6U, respectively. Likewise, third bearing portions 65D are integrally disposed on the upper surface of the other end of the lower casing 6D. A hexagonal engagement hole 66D is disposed in the center of a lower wall of the lower casing 6D. A connector portion 67D to which the connector 53 of the viewing unit 5 is detachably fitted is integrally provided on the other end of the lower casing 6D.

A rotation restriction projection 68D is located outward of the cylindrical portion 62D on the lower surface of one end of the lower casing 6D and is integrally disposed thereon in an arc shape around the rotation center line O. The rotation restriction projection 68D is configured to restrict the rotation range (rotation angle) of the viewing assembly 4 to the range (angle) between the backward retracted position B and the forward retracted position C together with the rotation restriction projection 34 of the shaft 3. Each of two side surfaces of the rotation restriction projection 68D has a vertical surface or a substantially vertical surface. The cylindrical portion 62D of the lower casing 6D is provided with plural cut portions, i.e., two cut portions 69D in the embodiment.

(Description of Stopper 62)

A stopper 62 formed of a plate spring is fixed to the cylindrical portion 62D, which is located near the shaft 3, of the lower casing 6D of the casing 6U, 6D. As illustrated in FIGS. 6 to 8 and FIGS. 10 to 12, the stopper 62 is formed in an annular shape having a diameter equal to or substantially equal to a diameter of an arc of the positioning projections 35 of the shaft 3. Plural fixation projections, i.e., two fixation projections 63 in the embodiment are disposed protruding on an inner circumferential rim of the stopper 62 to fit in the cut portions 69D of the cylindrical portion 62D of the lower casing 6D. The fixation projections 63 are fitted in the cut portions 69D, and the stopper 62 is fixed near the shaft 3 in the lower casing 6D. The stopper 62 is disposed outward of the cylindrical portion 62D of the lower casing 6D and is located between the lower surface of the lower casing 6D and the upper surface of the disk portion 31 of the shaft 3.

Plural positioning projections, i.e., two positioning projections 64 as positioning portions in the embodiment are disposed on the stopper 62 to be curved and projected downward. Each of the two positioning projections 64 is in the center or substantially in the center of the two fixation projections 63 in a circumferential direction of the stopper 62. The two fixation projections 63 are located above the two positioning projections 64. Portions respectively disposed between one of the two fixation projections 63 and one of the two positioning projections 64 and between the other of the two fixation projections 63 and the other of the two positioning projections 64 are elastic deformation portions 65 elastically deformable in the up-down direction. When the viewing assembly 4 is rotated forward from the use position A, the positioning projection 64 of the stopper 62 is deformed upward in the axial direction of the shaft 3 due to the elastic deformation of the elastic deformation portion 65 as illustrated in FIG. 12C. The upper surface of the fixation projection 63 of the stopper 62 is brought in elastic contact with the lower surface of the lower casing 6D, and the lower surface of the positioning projection 64 of the stopper 62 is brought into elastic contact with the upper surface of the disk portion 31 of the shaft 3.

(Explanation of Motor 7M)

Figure 6:
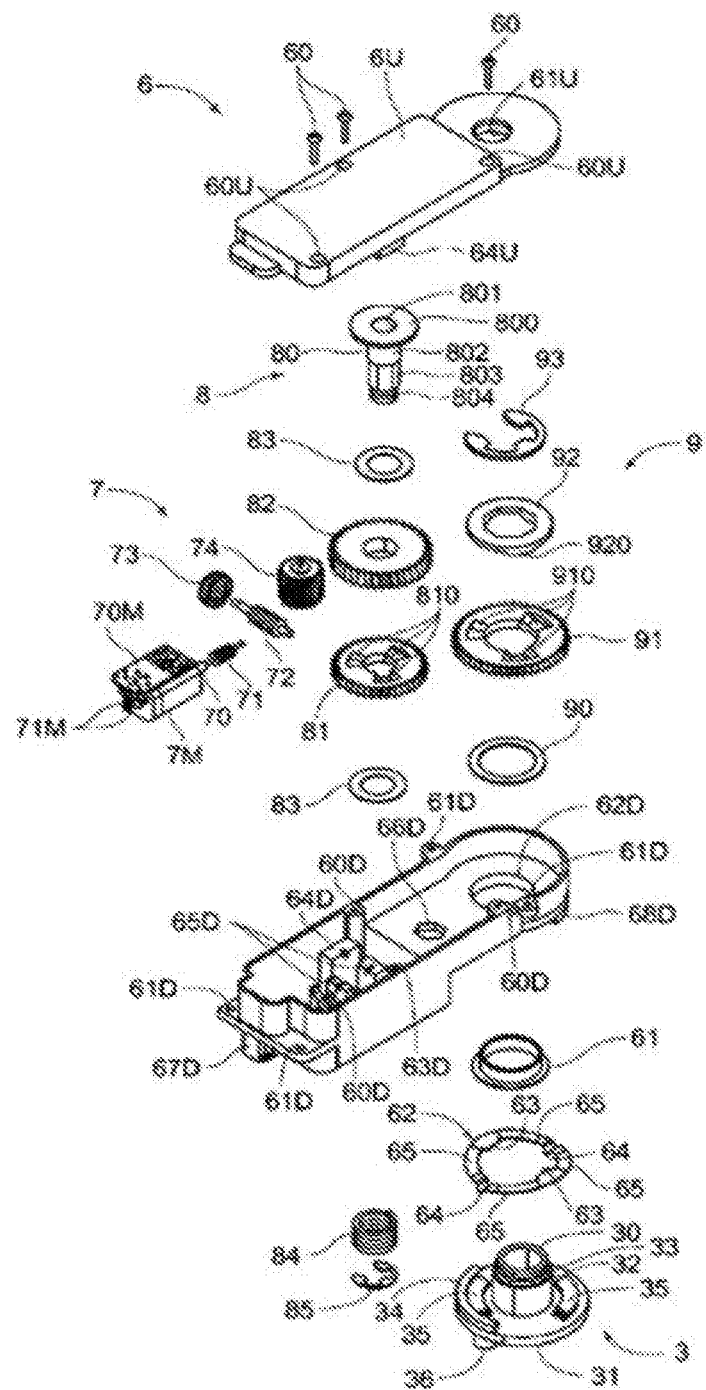
FIG. 6 is an exploded perspective view illustrating components of an electric retracting unit of a left electric retractable vehicle periphery viewing device when viewed from diagonally above.
Figure 7:
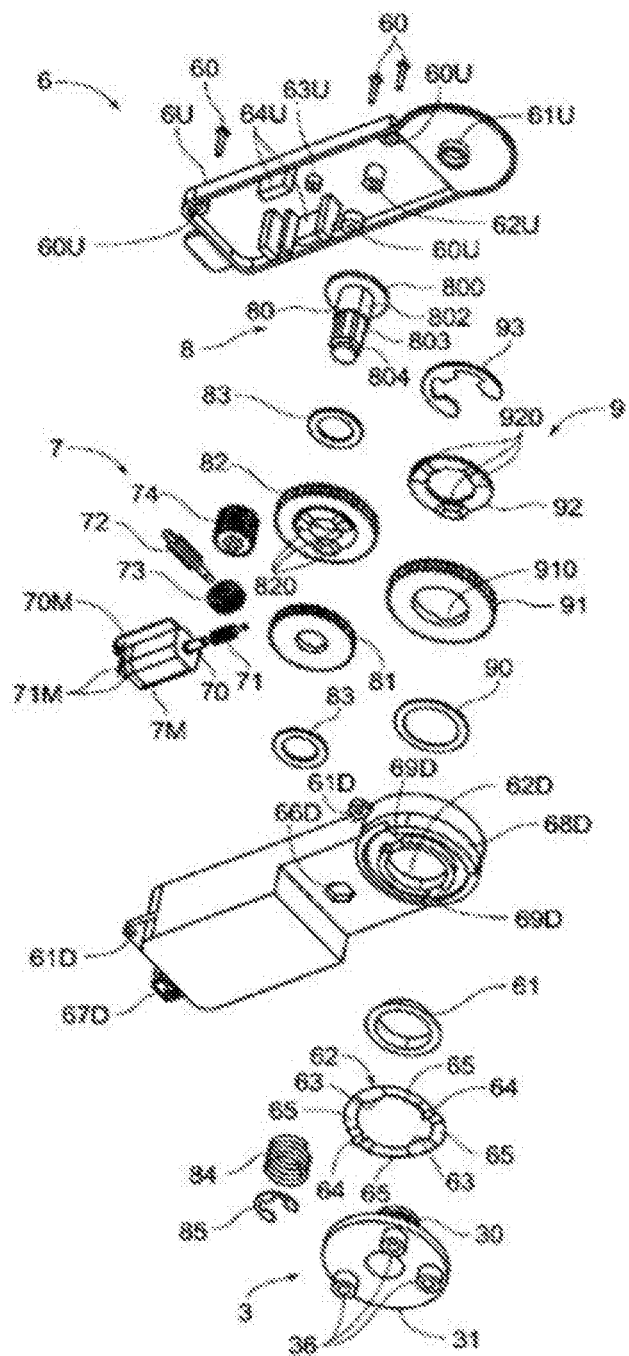
FIG. 7 is an exploded perspective view illustrating components of an electric retracting unit of a left electric retractable vehicle periphery viewing device when viewed from diagonally below.
Figure 8:
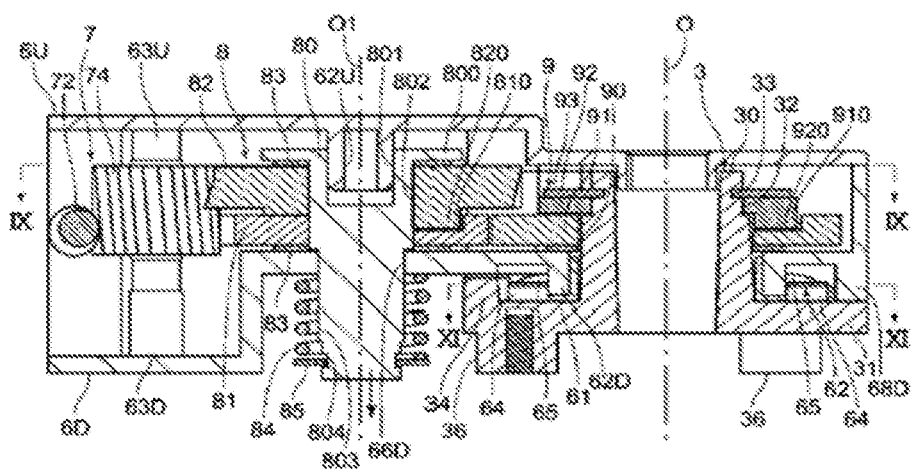
FIG. 8 is a partial cross-sectional view (a view taking along the line VIII-VIII in FIG. 5) illustrating a main part of an electric retracting unit of the left electric retractable vehicle periphery viewing device.
Figure 10:
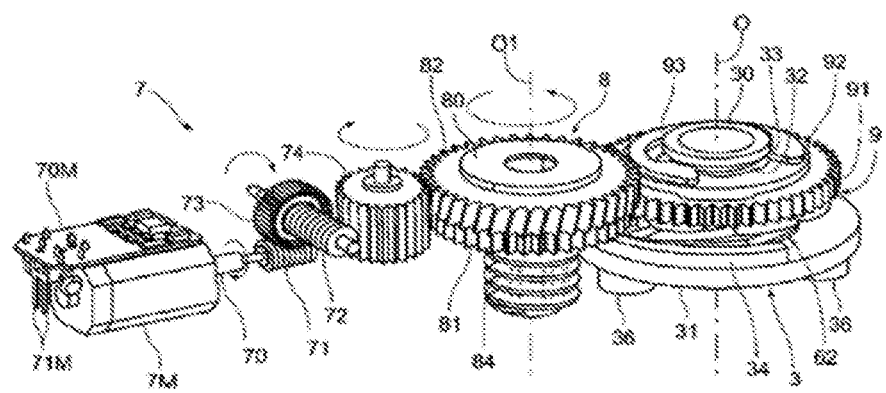
FIG. 10 is a perspective view illustrating an operation of a motor, a speed reduction mechanism, a clutch mechanism, and a rotational force transmission mechanism which are main portions of an electric retracting unit of a left electric retractable vehicle periphery viewing device.
Figure 11:
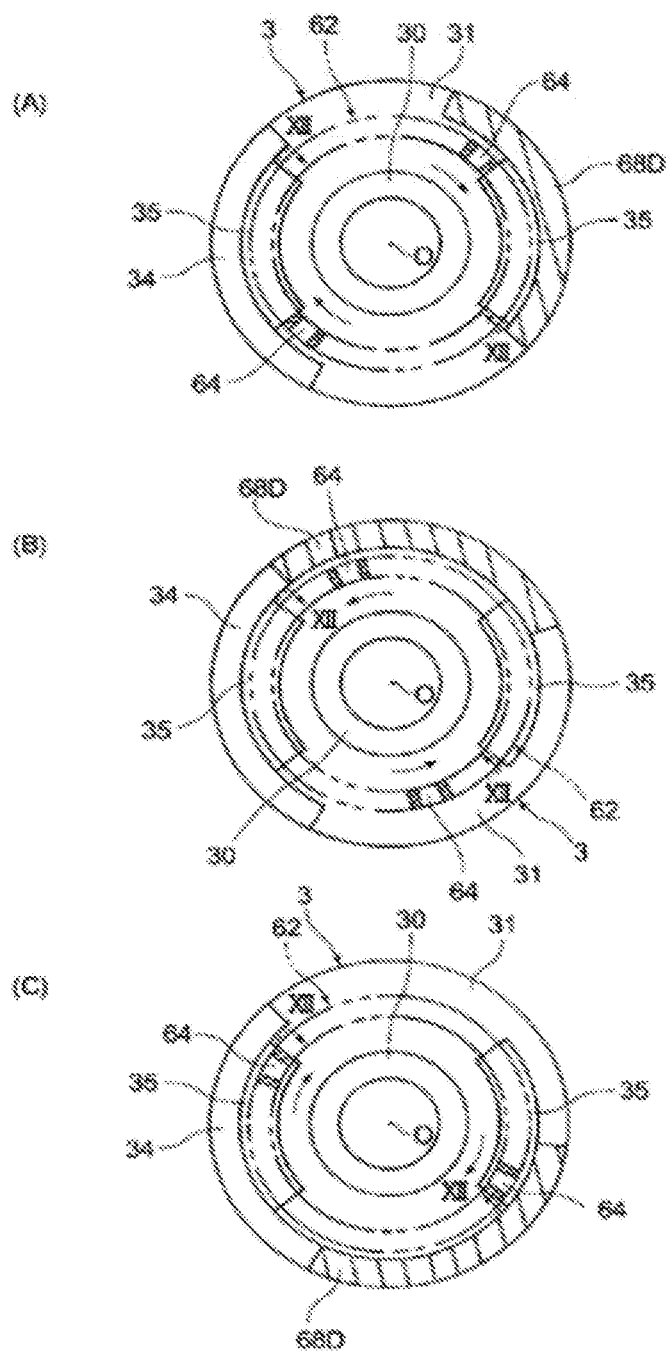
FIG. 11 is a partial transverse cross-sectional view (a cross-sectional view taken along the line XI-XI in FIG. 8) illustrating an operation of a shaft, a gear case, and a stopper of the electric retracting unit of the left electric retractable vehicle periphery viewing device.
Figure 12:
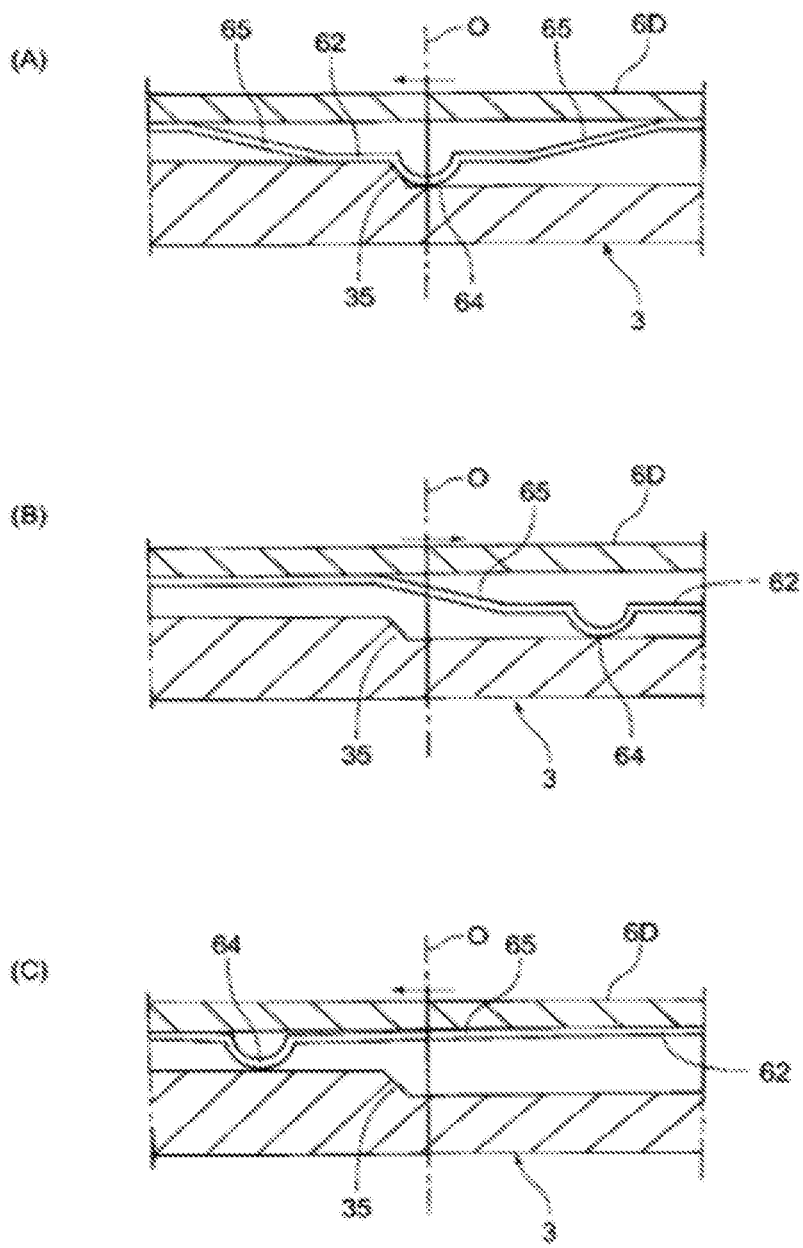
FIG. 12 is a partial vertical cross-sectional view (a cross-sectional view taken along the line XII-XII in FIGS. 11A, 11B, and 11C) illustrating an operation of the shaft, the gear case, and the stopper of the electric retracting unit of the left electric retractable vehicle periphery viewing device.
Figure 13:
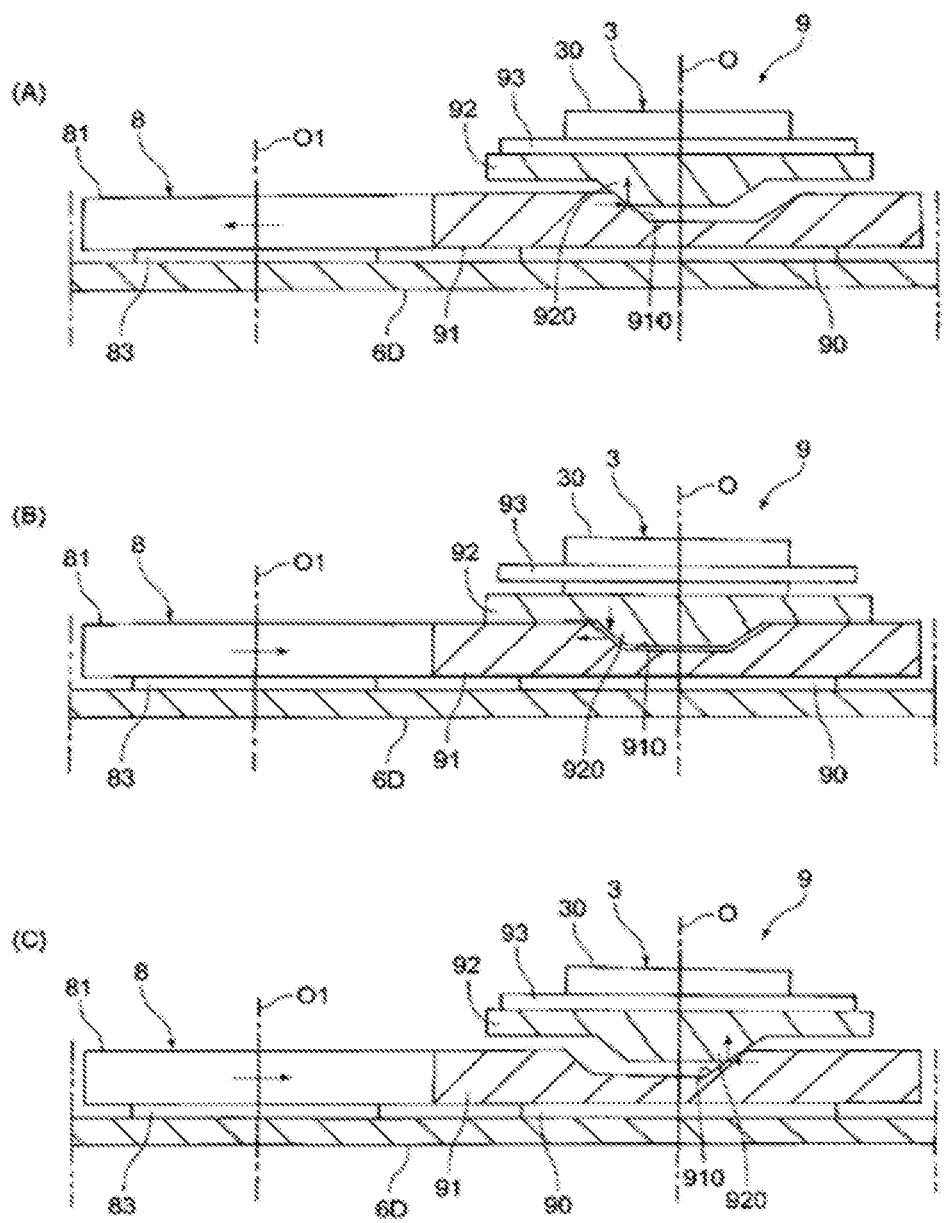
FIG. 13 is a partial transverse cross-sectional view illustrating an operation of a first lift member and a second lift member of a rotational force transmission mechanism of an electric retracting unit of a left electric retractable vehicle periphery viewing device.
Figure 14:
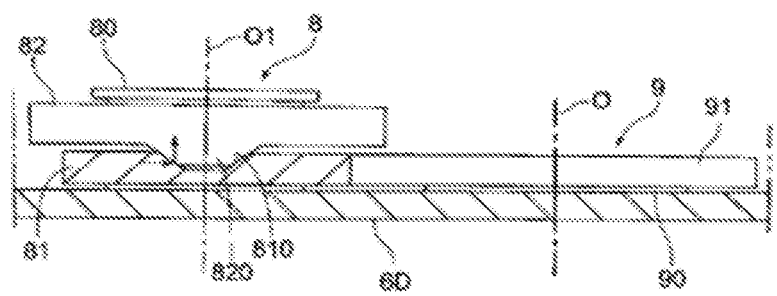
FIG. 14 is a partial transverse cross-sectional view illustrating an operation of a first clutch gear and a second clutch gear of a clutch mechanism of an electric retracting unit of a left electric retractable vehicle periphery viewing device.
Figure 14:
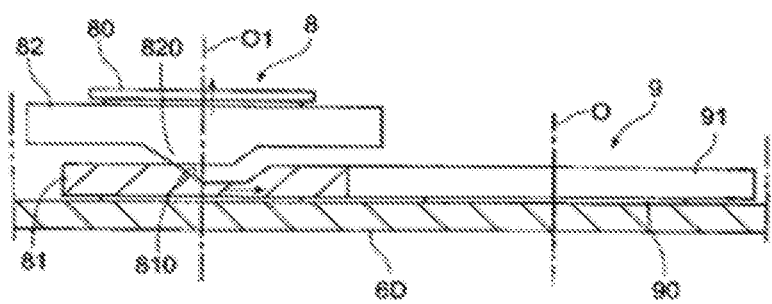
Figure 14:
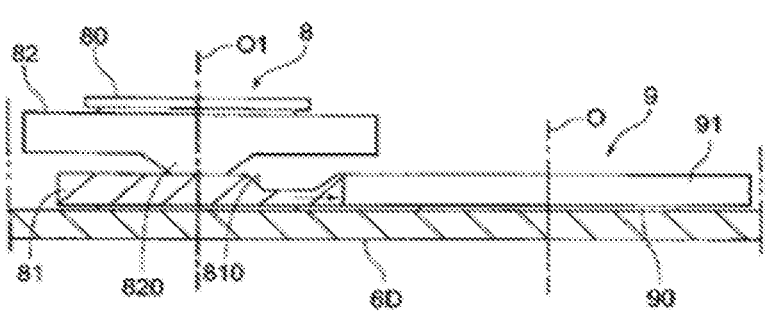
Figure 15:
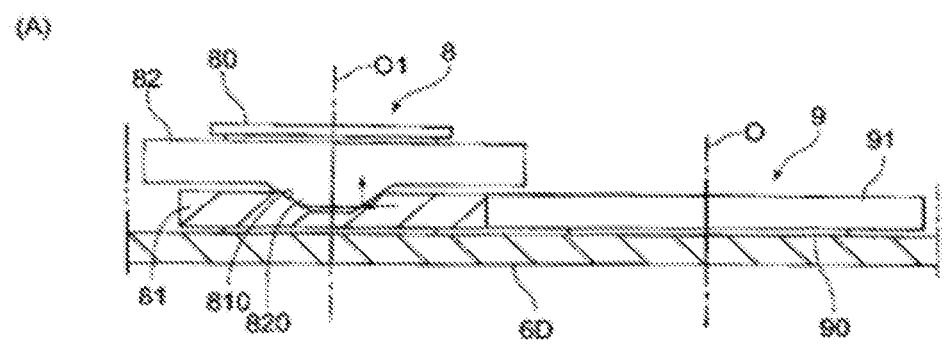
FIG. 15 is a partial transverse cross-sectional view illustrating an operation of a first clutch gear and a second clutch gear of a clutch mechanism of an electric retracting unit of a left electric retractable vehicle periphery viewing device.
Figure 15:
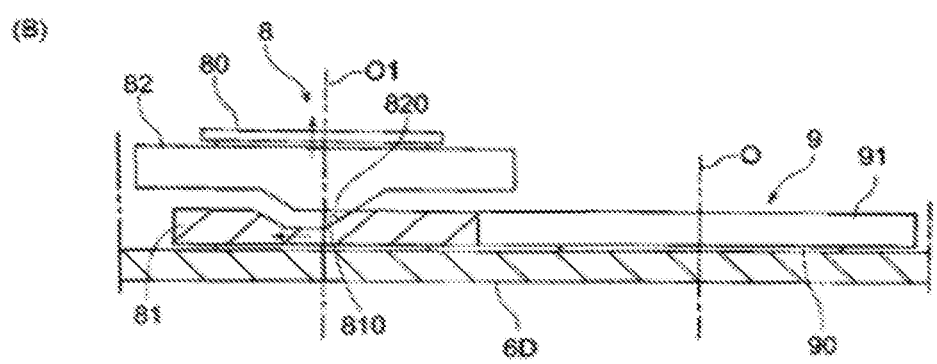
Figure 15:
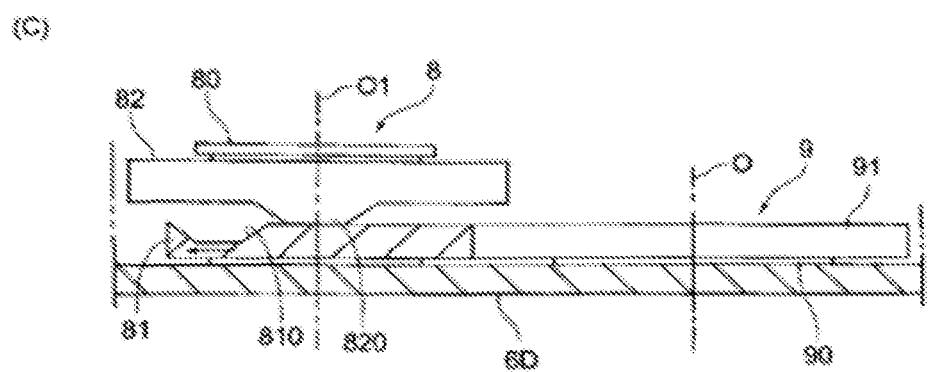

As illustrated in FIGS. 6, 7, and 10, the motor 7M is attached to the casing 6U, 6D and is housed in the casing 6U, 6D. A switch circuit 70M is disposed on the motor 7M. A terminal 71M is disposed on the switch circuit 70M. The terminal 71M is arranged in the connector portion 67D of the lower casing 6D. The connector 53 of the harness 52 is detachably fitted to the connector portion 67D of the lower casing 6D to be electrically connected to the terminal 71M; therefore, power is supplied via the harness 52, the connector 53, the terminal 71M, and the switch circuit 70M to the motor 7M.

(Description of Speed Reduction Mechanism 7)

As illustrated in FIGS. 6 to 10, the speed reduction mechanism 7 is attached to the casing 6U, 6D and is housed in the casing 6U, 6D. The speed reduction mechanism 7 includes a first worm gear 71, a second worm gear 72, a helical gear 73, and an idle gear 74. The first worm gear 71 is connected via a joint 70 to a drive shaft (an output shaft) of the motor 7M and is pivotally supported by the third bearing portions 65D of the lower casing 6D. The second worm gear 72 is pivotally supported by the second bearing portions 64U of the upper casing 6U and the second bearing portions 64D of the lower casing 6D. The helical gear 73 is fixed to a shaft of the second worm gear 72 and is engaged with the first worm gear 71. The idle gear 74 is engaged with the second worm gear 72 and is pivotally supported by the first bearing portion 63U of the upper casing 6U and the first bearing portion 63D of the lower casing 6D.

(Description of Clutch Mechanism 8)

As illustrated in FIGS. 6 to 10, FIG. 14, and FIG. 15, the clutch mechanism 8 is attached to the casing 6U, 6D and is partially housed in the casing 6U, 6D. The clutch mechanism 8 includes a clutch shaft 80, a first clutch gear 81 as a first clutch, a second clutch gear 82 as a second clutch, plural washers, i.e., two washers 83 in the embodiment, a coil-shaped clutch spring 84, and an E-ring (or a C-ring) 85. Note that the upper surface of the first clutch gear 81 of the clutch mechanism 8 is illustrated in a transverse cross-sectional view of FIG. 9.

A flange portion (collar portion) 800 is integrally disposed on an upper end of the clutch shaft 80. A circular recess 801 is disposed in the center of an upper end surface of the clutch shaft 80. A cylindrical shaft portion 802 is disposed on an upper end portion of the clutch shaft 80. A hexagonal column-shaped engagement portion 803 is disposed in an intermediate portion of the clutch shaft 80. A locking groove 804 is circumferentially disposed in a lower end portion of the clutch shaft 80.

The engagement portion 803 of the clutch shaft 80 is engaged with the engagement hole 66D of the lower casing 6D not to rotate around a center line (hereinafter referred to as an "axial center line") O1 of the clutch shaft 80 and to be movable in a direction of the axial center line O1. The axial center line O1 is parallel to the shaft 3, that is, the rotation center line O. Note that parallelism in the specification and the appended claim includes slight attachment errors or slight inclinations.

The washer 83, the first clutch gear 81, the second clutch gear 82, and the washer 83 are disposed between the flange portion 800 of the clutch shaft 80 and the lower casing 6D to be fitted from the outside to the shaft portion 802 of the clutch shaft 80 in the mentioned order from the lower side to the upper side. Thus, the first clutch gear 81 and the second clutch gear 82 are attached to the clutch shaft 80. The second cylindrical portion 62U of the upper casing 6U is disposed to extend through the recess 801 of the clutch shaft 80. Therefore, the flange portion 800, the shaft portion 802, the first clutch gear 81, the second clutch gear 82, and the two washers 83, which are a portion of the clutch mechanism 8, are housed in the casing 6U, 6D.

The clutch spring 84 is fitted from the outside to the engagement portion 803 of the clutch shaft 80, which protrudes downward from the engagement hole 66D of the lower casing 6D. The E-ring 85 is locked to the locking groove 804 of the clutch shaft 80. Thus, the clutch spring 84 is disposed between the E-ring 85 and the lower casing 6D and is attached in a compressed state to the clutch shaft 80 and the lower casing 6D. As a result, the clutch shaft 80 is consistently biased downward of the casing 6U, 6D by spring force of the clutch spring 84 (see the solid line arrow in FIG. 8). In addition, the clutch spring 84 and the E-ring 85 are located outward of the casing 6U, 6D and are attached via the clutch shaft 80 to the casing 6U, 6D.

Plural notch recesses, i.e., three notch recesses 810 in the embodiment are disposed in the circumferential direction around the axial center line O1 on the upper surface of the first clutch gear 81 at equal intervals or substantially equal intervals. Plural notch projections, i.e., three notch projections 820 in the embodiment are disposed, corresponding to the notch recesses 810, in the circumferential direction around the axial center line O1 on a lower surface of the second clutch gear 82 at equal intervals or substantially equal intervals. Two side surfaces of each of the notch recesses 810 are inclined such that the width of each of the side surfaces decreases from the upper side to the lower side. When in a normal case, the notch recesses 810 and the notch projections 820 are engaged by the spring force of the clutch spring 84 to bring the clutch mechanism into a connected state and are not disengaged by a rotational force of the motor 7M. Accordingly, the rotational force of the motor 7M is transmitted via the speed reduction mechanism 7 to the rotational force transmission mechanism 9. Meanwhile, when an external force greater than the rotational force transmitted from the motor 7M is applied to the viewing assembly 4, the notch recesses 810 and the notch projections 820 are disengaged against the spring force of the clutch spring 84 to bring the clutch mechanism into a disconnected state. Accordingly, the viewing assembly 4 is rotated while the external force greater than the rotational force transmitted from the motor 7M is not transmitted from the viewing assembly 4 to the speed reduction mechanism 7.

(Description of Rotational Force Transmission Mechanism 9)

As illustrated in FIGS. 6 to 10 and FIG. 13, the rotational force transmission mechanism 9 is attached to the shaft 3 and is housed in the casing 6U, 6D. The rotational force of the motor 7M is transmitted by rotational force transmission mechanism 9 via the speed reduction mechanism 7 and the clutch mechanism 8 to the casing 6U, 6D, and thus the viewing assembly 4 is rotated between the use position A and the backward retracted position B.

The rotational force transmission mechanism 9 includes a washer 90, a lift gear 91 as a first lift member, a lift holder 92 as a second lift member, and an E-ring (or a C-ring) 93. A circular through-hole is disposed in the center of the lift gear 91. A substantially octagonal through-hole (a serration or a spline may be acceptable) is disposed in the center of the lift holder 92.

The washer 90 is fitted from the upper side to the shaft portion 30 of the shaft 3. The lift gear 91 is disposed on the washer 90 and is fitted from the upper side to the shaft portion 30 of the shaft 3 to be rotatable around the rotation center line O and to move in the direction of the rotation center line O. The lift holder 92 is, on the lift gear 91, fitted from the outside to the engagement portion 32 of the shaft portion 30 of the shaft 3 not to rotate around the rotation center line O and to move in the direction of the rotation center line O. The E-ring 93 is, on the lift holder 92, fitted from the outside to the locking groove 33 of the shaft portion 30 of the shaft 3. The washer 90, the lift gear 91, the lift holder 92, and the E-ring 93 are housed in the casing 6U, 6D.

Plural anti-backlash recesses, i.e., three anti-backlash recesses 910 as anti-backlash portions in the embodiment are disposed circumferential direction around the rotation center line O on an upper surface of the lift gear 91 at equal intervals or substantially equal intervals. Plural anti-backlash projections, i.e., three anti-backlash projections 920 as anti-backlash portions in the embodiment are disposed circumferential direction around the rotation center line O on a lower surface of the lift holder 92 at equal intervals or substantially equal intervals to be provided corresponding to the three anti-backlash recesses 910 of the lift gear 91. Two side surfaces of each of the anti-backlash recesses 910 are inclined such that the width of each of the side surfaces decreases from the upper side to the lower side. Meanwhile, two side surfaces of each of the anti-backlash projections 920 are inclined such that the width of each of the side surfaces decreases from the upper side to the lower side. As illustrated in FIGS. 13A and 13C, when the viewing assembly 4 is located at the use position A or the backward retracted position B, the force in the rotation direction of the shaft 3 (around the rotation center line O), which is applied to the lift gear 91 due to the rotational force of the motor 7M is dispersed in the axial direction of the shaft 3 and the rotation direction of the shaft 3 by the anti-backlash recesses 910 and the anti-backlash projections 920. Thus, backlash in the axial direction of the shaft 3 and backlash in the rotation direction of the shaft 3 can be stopped at the shaft portion 30 of the shaft 3.

(Description of Operation of First Embodiment)

The electric retractable vehicle periphery viewing device 1, according to the first embodiment is configured as described above, and the operation thereof will be herein described.

(Description of Use Position A)

Main components when the viewing assembly 4 is located at the use position A will be described. First, the curved left side surface of the positioning projection 64 of the stopper 62 is in contact with the inclined right side surface of the positioning projection 35 of the shaft 3 (see FIGS. 11A and 12A). Further, in the clutch mechanism 8, the notch recess 810 of the first clutch gear 81 and the notch projection 820 of the second clutch gear 82 are fitted to each other by the spring force of the clutch spring 84, and thus the clutch mechanism 8 is in a connected state (see FIGS. 14A and 15A). Furthermore, in the rotational force transmission mechanism 9, the lift gear 91 is tightened by a rotational force of the first clutch gear 81 of the clutch mechanism 8 (the rotational force in a direction indicated by the solid left-pointing arrow in FIG. 13A). As a result, the force in the rotation direction of the shaft 3 (the force in a direction indicated by the solid right-pointing arrow in FIG. 13A) is applied to the lift gear 91. Thus, the inclined left side surface of the anti-backlash projection 920 of the lift holder 92 is lifted up in the axial direction of the shaft 3 (a direction indicated by the solid up-pointing arrow in FIG. 13A) by the inclined left side surface of the anti-backlash recess 910 of the lift gear 91. In this condition, the lift gear 91 and the lift holder 92 of the rotational force transmission mechanism 9 are in a state where backlash in the axial direction of the shaft 3 and backlash in the rotation direction of the shaft 3 are stopped, that is, in a fixed held state.

(Description of Electrical Backward Retraction)

When the viewing assembly 4 is located at the use position A, the drive shaft of the motor 7M is rotated forward (or reverse) and thus the first worm gear 71 of the speed reduction mechanism 7 is rotated in a direction indicated by the solid arrow in FIG. 10. Accordingly, the first clutch gear 81 and the second clutch gear 82 of the clutch mechanism 8 are rotated via the first worm gear 71, the helical gear 73, the second worm gear 72, and the idle gear 74 of the speed reduction mechanism 7 in a direction indicated by the solid arrows in FIGS. 9, 10, and 13B. Therefore, in the rotational force transmission mechanism 9, the lift gear 91 rotates in a direction indicated by the solid left-pointing arrows in FIGS. 13B and 13C with respect to the lift holder 92, and thus the inclined right side surface of the anti-backlash recess 910 of the lift gear 91 is brought into contact with the inclined right side surface of the anti-backlash projection 920 of the lift holder 92. Consequently, the rotation of the lift gear 91 is stopped (see FIG. 13C). Note that the lift holder 92 is not rotatable around the rotation center line O with respect to the shaft portion 30 of the shaft 3 and is movable in the direction of the rotation center line O. Therefore, while the lift gear 91 is rotating from a state illustrated in FIG. 13A to a state illustrated in FIG. 13C, the lift holder 92 does not rotate but moves downward under its own weight in a direction indicated by the solid down-pointing arrow in FIG. 13B.

When the rotation of the lift gear 91 is stopped, a reaction force from the shaft 3 is generated. Accordingly, the first clutch gear 81 and the second clutch gear 82 rotate around the axial center line O1 in the direction indicated by the solid arrows in FIGS. 9, 10, and 13C while rotating around the rotation center line O in a direction indicated by the solid arrow G in FIG. 9. Therefore, the clutch shaft 80 and the casing 6U, 6D are pressed around the rotation center line O in the direction of the solid arrow G in FIG. 9 by the first clutch gear 81 and the second clutch gear 82. As a result, the viewing assembly 4 is electrically rotated from the use position A to the backward retracted position B. At this time, the casing 6U, 6D and the stopper 62 rotate in a direction indicated by the solid arrows in FIGS. 11B and 12B, and the curved left side surface of the positioning projection 64 of the stopper 62 separates from the inclined right side surface of the positioning projection 35 of the shaft 3 as illustrated in FIGS. 11B and 12B.

When the viewing assembly 4 is located to the backward retracted position B, one of the side surfaces of the rotation restriction projection 68D of the casing 6U, 6D is brought into contact with one of the side surfaces of the rotation restriction projection 34 of the shaft 3 as illustrated in FIG. 11B. Therefore, the forward rotation of the motor 7M is stopped by action of the switch circuit 70M, and thus the viewing assembly 4 is stopped and located at the backward retracted position B.

At this time, with the maximum power (stall torque) of the motor 7M, the lift gear 91 is tightened in the rotational force transmission mechanism 9 by the rotational force of the first clutch gear 81 of the clutch mechanism 8 (the rotational force indicated by the solid right-pointing arrow in FIG. 13C). As a result, the force in the rotation direction of the shaft 3 (the force in a direction indicated by the solid left-pointing arrows in FIGS. 13B and 13C) is applied to the lift gear 91. Thus, the inclined right side surface of the anti-backlash projection 920 of the lift holder 92 is lifted up in the axial direction of the shaft 3 (a direction indicated by the solid up-pointing arrow in FIG. 13C) by the inclined right side surface of the anti-backlash recess 910 of the lift gear 91. In this condition, the lift gear 91 and the lift holder 92 of the rotational force transmission mechanism 9 are in a state where backlash in the axial direction of the shaft 3 and backlash in the rotation direction of the shaft 3 are stopped, that is, in a fixed held state. Under the fixed held state where the gear is tightened, loosening generated by vibration or the like is transmitted from the lift gear 91 via the clutch mechanism 8 and the idle gear 74 to the second worm gear 72; however, the loosening is prevented by a self lock effect between the second worm gear 72 and the idle gear 74.

(Description of Electrical Return to Use Position)

When the viewing assembly 4 is located at the backward retracted position B, the drive shaft of the motor 7M is rotated reverse (or forward). Accordingly, the first clutch gear 81 and the second clutch gear 82 are rotated via the speed reduction mechanism 7, reversely from the aforementioned electrical backward retraction, in a direction opposite to the direction indicated by the solid arrows in FIGS. 9, 10, and 13B. Therefore, the lift gear 91 rotates in a direction opposite to the direction indicated by the solid left-pointing arrows in FIGS. 13B and 13C with respect to the lift holder 92, and thus the inclined left side surface of the anti-backlash recess 910 of the lift gear 91 is brought into contact with the inclined left side surface of the anti-backlash projection 920 of the lift holder 92. Consequently, the rotation of the lift gear 91 is stopped (see FIG. 13A).

When the rotation of the lift gear 91 is stopped, a reaction force from the shaft 3 is generated. Accordingly, the first clutch gear 81 and the second clutch gear 82 rotate around the axial center line O1 in a direction opposite to the direction indicated by the solid arrows in FIGS. 9, 10, and 13C while rotating around the rotation center line O in a direction opposite to the direction of the solid arrow G in FIG. 9. Therefore, the clutch shaft 80 and the casing 6U, 6D are pressed around the rotation center line O in the direction opposite to the direction of the solid arrow G in FIG. 9 by the first clutch gear 81 and the second clutch gear 82. As a result, the viewing assembly 4 is electrically rotated from the backward retracted position B to the use position A. At this time, the casing 6U, 6D and the stopper 62 rotate in a direction indicated by the solid arrows in FIGS. 11A and 12A.

When the viewing assembly 4 comes to the use position A, the curved left side surface of the positioning projection 64 of the stopper 62 is brought into contact with the inclined right side surface of the positioning projection 35 of the shaft 3 as illustrated in FIG. 11A and FIG. 12A. Therefore, the reverse rotation of the motor 7M is stopped by action of the switch circuit 70M, and thus the viewing assembly 4 is stopped and located at the use position A.

At this time, with the maximum power (stall torque) of the motor 7M, the lift gear 91 is tightened in the rotational force transmission mechanism 9 by the force in the rotation direction of the first clutch gear 81 of the clutch mechanism 8 (see the solid left-pointing arrow in FIG. 13A). As a result, the force in the rotation direction of the shaft 3 (the force in the direction indicated by the solid right-pointing arrow in FIG. 13A) is applied to the lift gear 91. Thus, the inclined left side surface of the anti-backlash projection 920 of the lift holder 92 is lifted up in the axial direction of the shaft 3 (see the solid up-pointing arrow in FIG. 13A) by the inclined left side surface of the anti-backlash recess 910 of the lift gear 91. In this condition, the lift gear 91 and the lift holder 92 of the rotational force transmission mechanism 9 are in a state where backlash in the axial direction of the shaft 3 and backlash in the rotation direction of the shaft 3 are stopped, that is, in a fixed held state. Under the fixed held state where the gear is tightened, loosening generated by vibration or the like is transmitted from the lift gear 91 via the clutch mechanism 8 and the idle gear 74 to the second worm gear 72; however, the loosening is prevented by the self lock effect between the second worm gear 72 and the idle gear 74.

(Description of Manual Backward Retraction)

At the time of manually rotating the viewing assembly 4 located at the use position A toward the back side E of the vehicle V, the condition of the rotational force transmission mechanism 9 is not different from the condition thereof when the viewing assembly 4 is located at the use position A. In other words, the force in the rotation direction of the shaft 3 (the force in the direction indicated by the solid right-pointing arrow in FIG. 13A) is applied to the lift gear 91. Thus, the inclined left side surface of the anti-backlash projection 920 of the lift holder 92 is lifted up in the direction indicated by the solid up-pointing arrow in FIG. 13A by the inclined left side surface of the anti-backlash recess 910 of the lift gear 91. In addition, the first clutch gear 81 is engaged with the lift gear 91 and is likely to rotate around the axial center line O1 in the direction indicated by the solid arrow in FIG. 9. However, the notch recesses 810 of the first clutch gear 81 are fitted to the notch projections 820 of the second clutch gear 82. The second clutch gear 82 is structured to rotate via the idle gear 74 in conjunction with the rotation of the second worm gear 72 of the speed reduction mechanism 7 that cannot be rotated by the drive shaft of the motor 7M; therefore, the second clutch gear 82 cannot rotate around the axial center line O1. Consequently, the first clutch gear 81 cannot rotate around the axial center line O1.

As a result, the rotational force indicated by the solid right-pointing arrows in FIGS. 14A and 14B is applied to the first clutch gear 81, and thus the inclined left side surface of the notch projection 820 of the second clutch gear 82 is lifted up in a direction indicated by the solid up-pointing arrows in FIGS. 14A and 14B by the inclined left side surface of the notch recess 810 of the first clutch gear 81. At this time, the force (rotational force manually applied in a direction from the use position A to the backward retracted position B) applied to the viewing assembly 4 is greater than the rotational force transmitted from the motor 7M; therefore, the second clutch gear 82 is lifted up via the shaft 3 against the spring force of the clutch spring 84 in a direction indicated by the solid up-pointing arrow in FIG. 14B. Consequently, as illustrated in FIG. 14C, the fitted state of the notch recesses 810 of the first clutch gear 81 with the notch projections 820 of the second clutch gear 82 is released; therefore, the clutch mechanism 8 is brought into a disconnected state. Note that the rotational force greater than the rotational force transmitted from the motor 7M may be set at any value.

Figure 9:
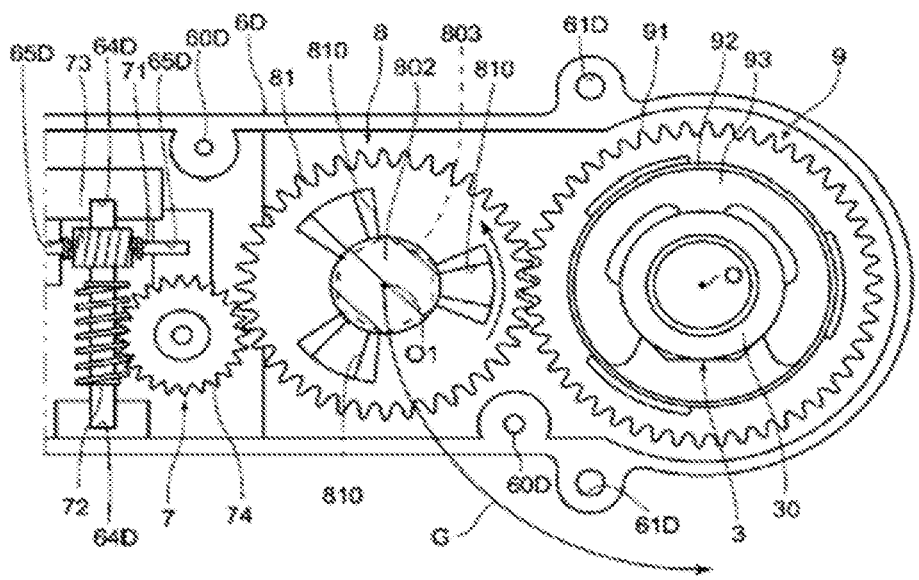
FIG. 9 is a partial plan view (a view taking along the line IX-IX in FIG. 8, a partial plan view of a state where an upper casing (cover) is removed) illustrating a main part of the electric retracting unit of the left electric retractable vehicle periphery viewing device.

Thus, the first clutch gear 81 rotates around the axial center line O1 in the direction indicated by the solid arrow in FIG. 9 while rotating around the rotation center line O in the direction of the solid arrow G in FIG. 9. Therefore, the second clutch gear 82 and the casing GU, 6D are pressed via the clutch shaft 80 around the rotation center line O in the direction of the solid arrow G in FIG. 9. As a result, the viewing assembly 4 is manually rotated from the use position A to the backward retracted position B. At this time, the second clutch gear 82 rotates around the rotation center line O in the direction of the solid arrow G in FIG. 9 but does not rotate around the axial center line O1 in the direction indicated by the solid arrow in FIG. 9. Then, the viewing assembly 4 rotates until one of the side surfaces of the rotation restriction projection 68D of the casing 6U, 6D is brought into contact with one of the side surfaces of the rotation restriction projection 34 of the shaft 3 (see FIG. 11B). Thus, the viewing assembly 4 stops at the backward retracted position B and is retracted toward the back side E of the vehicle V.

(Description of Manual Return to Use Position)

After the viewing assembly 4 is manually rotated toward the back side E of the vehicle V to the backward retracted position B, the viewing assembly 4 located at the backward retracted position B is manually rotated to the use position A. Contrary to the aforementioned manual backward retraction, the casing GU, 6D, the clutch shaft 80, and the first clutch gear 81 are rotated around the rotation center line O in the opposite direction from the direction of the solid arrow G in FIG. 9. Accordingly, the lift gear 91 is rotated around the rotation center line O in the opposite direction from the direction of the solid arrow G in FIG. 9, i.e., in the direction indicated by the solid left-pointing arrows in FIGS. 13B and 13C until the inclined right side surface of the anti-backlash recess 910 of the lift gear 91 is brought into contact with the inclined right side surface of the anti-backlash projection 920 of the lift holder 92. In addition, during the rotation of the lift gear 91, the first clutch gear 81 rotates together with the lift gear 91 around the rotation center line O in the opposite direction from the direction of the solid arrow G in FIG. 9. Therefore, the first clutch gear 81 does not rotate around the axial center line O1 in the opposite direction from the direction indicated by the solid arrow in FIG. 9 with respect to the clutch shaft 80.

The viewing assembly 4 is further manually rotated to the use position A. Accordingly, the second clutch gear 82 is further rotated around the rotation center line O in the opposite direction from the direction of the solid arrow G in FIG. 9 together with the casing 6U, 6D, the clutch shaft 80, the speed reduction mechanism 7, and the motor 7M. Meanwhile, the rotation of the lift gear 91 in the direction indicated by the solid left-pointing arrows in FIGS. 13B and 13C is prevented by contact of the anti-backlash recesses 910 of the lift gear 91 with the anti-backlash projections 920 of the lift holder 92. Therefore, the first clutch gear 81 rotates around the rotation center line O in the opposite direction from the direction of the solid arrow G in FIG. 9 while rotating around the axial center line O1 in the opposite direction from the direction indicated by the solid arrow in FIG. 9 and, with respect to the clutch shaft 80, in the opposite direction from the direction indicated by the solid right-pointing arrows in FIGS. 14A, 14B, and 14C.

Then, the viewing assembly 4 is rotated until the curved left side surface of the positioning projection 64 of the stopper 62 is brought into contact with the inclined right side surface of the positioning projections 35 of the shaft 3 (see FIGS. 11A, 12A), and is stopped at the use position A and returned. When the viewing assembly 4 is returned, a slight deviation due to non-rotation of the first clutch gear 81 around the axial center line O1 at the time of rotating the viewing assembly 4 located at the backward retracted position to the use position A remains around the axial center line O1 between the first clutch gear 81 and the second clutch gear 82. However, the slight deviation is within a range between the inclined surface of the notch recess 810 of the first clutch gear 81 and the inclined surface of the notch projection 820 of the second clutch gear 82. Therefore, as illustrated in FIG. 14A, the notch recess 810 of the first clutch gear 81 and the notch projection 820 of the second clutch gear 82 are fitted to each other by the spring force of the clutch spring 84; therefore, the clutch mechanism 8 returns to the initial connected state. Consequently, the lift gear 91 rotates in the opposite direction from the direction indicated by the solid left-pointing arrows in FIGS. 13B and 13C until the inclined left side surface of the anti-backlash recess 910 of the lift gear 91 is brought into contact with the inclined left side surface of the anti-backlash projection 920 of the lift holder 92. As a result, the rotational force transmission mechanism 9 is brought into the initial state where the viewing assembly 4 is located at the use position A. In other words, the inclined left side surface of the anti-backlash projection 920 of the lift holder 92 is lifted up in the direction indicated by the solid up-pointing arrow in FIG. 13A by the inclined left side surface of the anti-backlash recess 910 of the lift gear 91.

(Description of Manual Forward Retraction)

When the viewing assembly 4 is located at the use position A, the second worm gear 72 of the speed reduction mechanism 7 attached to the casing 6U, 6D does not rotate by an external force other than the rotational force of the motor 7M. The notch recesses 810 of the first clutch gear 81 are fitted to the notch projections 820 of the second clutch gear 82 rotational via the idle gear 74 in conjunction with the second worm gear 72. The first clutch gear 81 is engaged with the lift gear 91. Here, the viewing assembly 4 located at the use position A is manually rotated toward the front side F of the vehicle V. The lift gear 91 engaged with the first clutch gear 81 is rotated, as illustrated in FIG. 13C, around the rotation center line O in the opposite direction from the direction of the solid arrow G in FIG. 9, i.e., in the direction indicated by the solid arrow in FIG. 13C until the inclined right side surface of the anti-backlash recess 910 of the lift gear 91 is brought into contact with the inclined right side surface of the anti-backlash projection 920 of the lift holder 92.

While the lift gear 91 is rotating, the first clutch gear 81 and the second clutch gear 82 rotate around the rotation center line O in the opposite direction from the direction of the solid arrow G in FIG. 9 with the notch projections 820 engaged with the notch recesses 810. Accordingly, likewise, the stopper 62 fixed to the casing 6U, 6D rotates with respect to the shaft 3 around the rotation center line O in the opposite direction from the direction of the solid arrow G in FIG. 9, i.e., in the direction indicated by the arrows in FIGS. 11C and 12C. Here, the positioning projection 64 of the stopper 62 moves upward over the inclined surface of the positioning projection 35 of the shaft 3. At this time, as illustrated in FIG. 12C, the elastic deformation portion 65 of the stopper 62 deforms; therefore, the whole electric retracting unit 6 does not move upward with respect to the shaft 3.

When the inclined right side surface of the anti-backlash recess 910 of the lift gear 91 is brought into contact with the inclined right side surface of the anti-backlash projection 920 of the lift holder 92, the lift gear 91 cannot rotate around the rotation center line O in the opposite direction from the direction of the solid arrow G in FIG. 9, i.e., in the direction indicated by the arrow in FIG. 13C. As a result, the first clutch gear 81 engaged with the lift gear 91 rotates around the rotation center line O in the opposite direction from the direction of the solid arrow G in FIG. 9 while rotating around the axial center line O1 in the opposite direction from the direction indicated by the solid arrow in FIG. 9 and in a direction indicated by the solid left-pointing arrow in FIG. 15A, with respect to the clutch shaft 80. The notch recesses 810 of the first clutch gear 81 are fitted to the notch projections 820 of the second clutch gear 82. The second clutch gear 82 is structured to rotate via the idle gear 74 in conjunction with the rotation of the second worm gear 72 of the speed reduction mechanism 7 that cannot be rotated by the drive shaft of the motor 7M; therefore, the second clutch gear 82 cannot rotate around the axial center line O1.

Accordingly, the rotational force in the direction indicated by the solid left-pointing arrows in FIGS. 15A and 15B is applied to the first clutch gear 81, and thus the inclined right side surface of the notch projection 820 of the second clutch gear 82 is lifted up in a direction indicated by the solid arrow up-pointing arrows in FIGS. 15A and 15B by the inclined right side surface of the notch recess 810 of the first clutch gear 81. At this time, when the force applied to the viewing assembly 4 (the rotational force from the use position A to the forward retracted position C) becomes a rotational force greater than the rotational force transmitted from the motor 7M, the second clutch gear 82 is lifted up via the shaft 3 against the spring force of the clutch spring 84 in the direction indicated by the solid up-pointing arrow in FIG. 15B. Consequently, as illustrated in FIG. 15C, the fitted state of the notch recesses 810 of the first clutch gear 81 with the notch projections 820 of the second clutch gear 82 are released; therefore, the clutch mechanism 8 is brought into a disconnected state.

Thus, the first clutch gear 81 rotates around the axial center line O1 in the opposite direction from the direction indicated by the solid arrow in FIG. 9 while rotating around the rotation center line O in the opposite direction from the direction of the solid arrow G in FIG. 9. Therefore, the second clutch gear 82 and the casing 6U, 6D are pressed via the clutch shaft 80 around the rotation center line O in the opposite direction from the direction of the solid arrow G in FIG. 9. As a result, the viewing assembly 4 is manually rotated from the use position A to the forward retracted position C. At this time, the second clutch gear 82 rotates around the rotation center line O in the opposite direction from the direction of the solid arrow G in FIG. 9 but does not rotate around the axial center line O1 in the direction indicated by the solid arrow in FIG. 9. Then, the viewing assembly 4 rotates until the other of the side surfaces of the rotation restriction projection 68D of the casing 6U, 6D is brought into contact with the other of the side surfaces of the rotation restriction projection 34 of the shaft 3 (see FIG. 11C). Thus, the viewing assembly 4 stops at the forward retracted position C and is retracted toward the front side F of the vehicle V.

(Description of Manual Return to Use Position)
After the viewing assembly 4 is manually rotated toward the front side F of the vehicle V to the forward retracted position C, the viewing assembly 4 located at the forward retracted position C is manually rotated to the use position A. Contrary to the aforementioned manual forward retraction, the casing 6U, 6D, the clutch shaft 80, the first clutch gear 81 and the second clutch gear 82 are rotated around the rotation center line O in the direction of the solid arrow G in FIG. 9. Here, the notch projections 820 of the second clutch gear 82 remain disengaged from the notch recesses 810 of the first clutch gear 81. Meanwhile, due to the spring force of the clutch spring 84, the rotational resistance between the lift gear 91 and the lift holder 92 is smaller than the rotational resistance between the first clutch gear 81 and the notch projections 820 of the second clutch gear 82. Accordingly, the lift gear 91 is rotated around the rotation center line O in the direction of the solid arrow G in FIG. 9, i.e., in the opposite direction from the direction indicated by the solid left-pointing arrows in FIGS. 13B and 13C until the inclined left side surface of the anti-backlash recess 910 of the lift gear 91 is brought into contact with the inclined left side surface of the anti-backlash projection 920 of the lift holder 92.

Here, the notch projections 820 of the second clutch gear 82 remain disengaged from the notch recesses 810 of the first clutch gear 81. Therefore, in the same way as the aforementioned manual forward retraction, the first clutch gear 81 rotates around the axial center line O1 in the direction indicated by the solid arrow in FIG. 9 and in the direction opposite from the solid right-pointing arrows in FIGS. 15B and 15C while rotating in the rotation center line O in the direction of the solid arrow G in FIG. 9. Therefore, the second clutch gear 82, the casing 6U, 6D, and the stopper 62 are pressed via the clutch shaft 80 around the rotation center line O in the direction of the solid arrow G in FIG. 9. Consequently, the second clutch gear 82 rotates together with the casing 6U, 6D, the stopper 62, and the like around the rotation center line O in the direction of the solid arrow G in FIG. 9 and in the opposite direction from the direction indicated by the solid arrows in FIGS. 11C and 12C. As a result, the viewing assembly 4 is manually rotated from the forward retracted position C to the use position A. At this time, the notch projections 820 of the second clutch gear 82 remain disengaged from the notch recesses 810 of the first clutch gear 81.

Then, when the viewing assembly 4 comes to the use position A, the stopper 62 returns to the initial state as illustrated in FIGS. 11A and 12A and the curved left side surface of the positioning projection of the stopper 62 is brought into contact with the inclined right side surface of the positioning projection 35 of the shaft 3. In addition, the notch recesses 810 of the first clutch gear 81 and the notch projections 820 of the second clutch gear 82 are fitted to each other. Thus, the viewing assembly 4 returns to the use position A to be brought into the initial state.

(Description of Effects of First Embodiment)
The electric retractable vehicle periphery viewing device 1 according to the first embodiment has the configuration and operation as described above, and the effects thereof will be described below.

The electric retractable vehicle periphery viewing device 1 according to the first embodiment can improve fuel efficiency due to air resistance and can prevent a damage or the like in the case of a collision of an obstacle when the device 1 is in use.

In other words, the electric retractable vehicle periphery viewing device 1 according to the first embodiment is structured such that the motor 7M, the speed reduction mechanism 7, the clutch mechanism 8, and the rotational force transmission mechanism 9 are disposed in the direction intersecting with (orthogonal to or substantially orthogonal to) the axial direction of the shaft 3 (the rotation center line O). Consequently, as illustrated in FIG. 2B, in the electric retractable vehicle periphery viewing device 1 according to the first embodiment, a length (up-down length) T of the viewing assembly 4 in the axial direction of the shaft 3 can be reduced with respect to the outside mirror device M (see the alternate long and short dash line in FIG. 2B), for example, the electric tiltable door mirror of Patent Literature 2. Thus, the electric retractable vehicle periphery viewing device 1 according to the first embodiment can improve aerodynamic performance of the vehicle (automobile) V and reduce the weight of the vehicle V, and the electric retractable vehicle periphery viewing device 1 can improve the fuel efficiency due to air resistance.

Further, when the electric retractable vehicle periphery viewing device 1 according to the first embodiment is in use in a state where the viewing assembly 4 is protruded outward of the base 2 from the lateral side of the vehicle V, an obstacle may be brought into collision with the viewing assembly 4 from the front or back side with a load greater than the rotational force transmitted from the motor 7M. In such a case, the viewing assembly 4 rotates forward or backward for buffering. Thus, in a case where an obstacle is brought into collision with the viewing assembly 4 from the front or back side when the electric retractable vehicle periphery viewing device 1 according to the first embodiment is in use, a damage or the like of the viewing assembly 4 can be prevent.

Furthermore, the electric retractable vehicle periphery viewing device 1 according to the first embodiment is structured such that the electric retracting unit 6 is housed in the housing 4U, 4D of the viewing assembly 4 and such that the casing 6U, 6D of the electric retracting unit 6 is fixed to the housing 4U, 4D. Accordingly, in the electric retractable vehicle periphery viewing device 1 according to the first embodiment, the casing 6U, 6D can serve as a bracket in the housing 4U, 4D, and thus a bracket for reinforcement is unnecessary. Therefore, the number of components can be reduced and the viewing assembly 4 can be reduced in weight, and in addition, manufacturing costs can be reduced.

In the electric retractable vehicle periphery viewing device 1 according to the first embodiment, when the viewing assembly 4 is located at the use position A or the backward retracted position B, the force in the rotation direction, which is applied to the lift gear 91 due to the rotational force transmitted from the motor 7M is dispersed in the axial direction of the shaft 3 and the rotation direction of the shaft 3 by the anti-backlash recesses 910 of the lift gear 91 and the anti-backlash projections 920 of the lift holder 92 in the rotational force transmission mechanism 9. Therefore, in the electric retractable vehicle periphery viewing device 1 according to the first embodiment, with the use of the maximum power (stall torque) of the motor 7M, the lift gear 91 is tightened in the axial direction of the shaft 3 and in the rotation direction of the shaft 3. Consequently, backlash in the axial direction of the shaft 3 and backlash in the rotation direction of the shaft 3 can be stopped in the rotational force transmission mechanism 9 as a rotary part of the viewing assembly 4.

In addition, the electric retractable vehicle periphery viewing device 1 according to the first embodiment is structured such that backlash in the axial direction of the shaft 3 and backlash in the rotation direction of the shaft 3 can be stopped with the use of the maximum power (stall torque) of the motor 7M while the shaft 3 is not provided with a spring such as a coil spring. Accordingly, since the spring is not used, the length T of the viewing assembly 4 in the axial direction of the shaft 3 can be further reduced.

In the electric retractable vehicle periphery viewing device 1 according to the first embodiment, the shaft 3 and the stopper 62 that are fixed to the lower casing 6D are respectively provided with the positioning projections 35 and the positioning projections 64 brought into contact with each other when the viewing assembly 4 is located at the use position A. The positioning projections 64 of the stopper 62 are deformed in the axial direction of the shaft 3 when the viewing assembly 4 is rotated forward from the use position A. Therefore, the electric retractable vehicle periphery viewing device 1 according to the first embodiment is structured such that when the viewing assembly 4 is rotated forward from the use position A, the electric retracting unit 6 does not move with respect to the shaft 3 in the axial direction of the shaft 3. Consequently, the electric retractable vehicle periphery viewing device 1 according to the first embodiment is structured such that a clearance between the lower casing 6D of the electric retracting unit 6 and the disk portion 31 of the shaft 3 is not largely increased, and thus foreign substances such as dusts can be inhibited from entering in the clearance. As a result, the electric retractable vehicle periphery viewing device 1 according to the first embodiment is structured such that the electric retracting unit 6, that is, the viewing assembly 4 can smoothly rotate, and in addition, the durability of components can be improved.

The electric retractable vehicle periphery viewing device 1 according to the first embodiment is structured such that the first clutch gear 81, the second clutch gear 82, and the clutch spring 84 are disposed on the clutch shaft 80 having the axial center line (the center line of the clutch shaft 80) O1 parallel to the rotation center line O (the center line of the shaft portion 30 of the shaft 3) O. Accordingly, since in the electric retractable vehicle periphery viewing device 1 according to the first embodiment, the shaft 3 does not need to include a spring such as a coil spring for a clutch, the length T of the viewing assembly 4 in the axial direction of the shaft 3 can be further reduced.

Additionally, the electric retractable vehicle periphery viewing device 1 according to the first embodiment 1 includes the clutch mechanism 8 as a separate member from the shaft 3 serving as the rotation center of the viewing assembly 4. Therefore, the electric retractable vehicle periphery viewing device 1 according to the first embodiment is structured such that the clutch spring 84 of the clutch mechanism 8 is dedicated to clutch torque, and the electric retractable vehicle periphery viewing device 1 does not need torque for inhibiting vibration of the viewing assembly 4. Consequently, the electric retractable vehicle periphery viewing device 1 according to the first embodiment can reduce a spring load of the clutch spring 84, and thus a rotational load between the first clutch gear 81 and the second clutch gear 82 can be reduced. As a result, the electric retractable vehicle periphery viewing device 1 according to the first embodiment is structured such that the clutch mechanism 8 can be operated with a small force, and the durability of components can be improved.

Moreover, the electric retractable vehicle periphery viewing device 1 according to the first embodiment is structured such that the shaft 3 by which the viewing assembly 4 is rotatably attached and the clutch shaft 80 of the clutch mechanism 8 adapted to prevent a damage or the like of the viewing assembly 4 are disposed in parallel to each other as separate members. Therefore, as illustrated in FIG. 2B, the electric retractable vehicle periphery viewing device 1 according to the first embodiment is structured such that the length (up-down length) T of the viewing assembly 4 in the axial direction of the shaft 3 can be reduced with respect to the electric retractable vehicle image display 4M including a single shaft portion of the shaft and the clutch shaft. Note that since the electric retractable vehicle image display 4M uses an imaging device instead of a mirror, the up-down length of the vehicle image display 4M is small compared with the outside mirror device M.

The electric retractable vehicle periphery viewing device 1 according to the first embodiment is an imaging device structured such that the viewing unit 5 captures an image around the vehicle V. Therefore, the length T of the housing 4U, 4D of the viewing assembly 4, which houses the viewing unit 5 as the imaging device together with the electric retracting unit 6, i.e., the length (up-down length) T of the viewing assembly 4 in the axial direction of the shaft 3 can be surely reduced compared with the outside mirror device M using a mirror.

The electric retractable vehicle periphery viewing device 1 according to the first embodiment can display on the display 5M, images, captured by the viewing unit 5 as an imaging device, of the information on the back side and the lateral side of the vehicle V. Therefore, the electric retractable vehicle periphery viewing device 1 according to the first embodiment allows a driver to visually recognize the back side and the lateral side of the vehicle V by viewing the images displayed on the display 5M. Consequently, the electric retractable vehicle periphery viewing device 1 according to the first embodiment can contribute to traffic safety in the same way as the mirror.

(Description of Second Embodiment)

Figure 17:
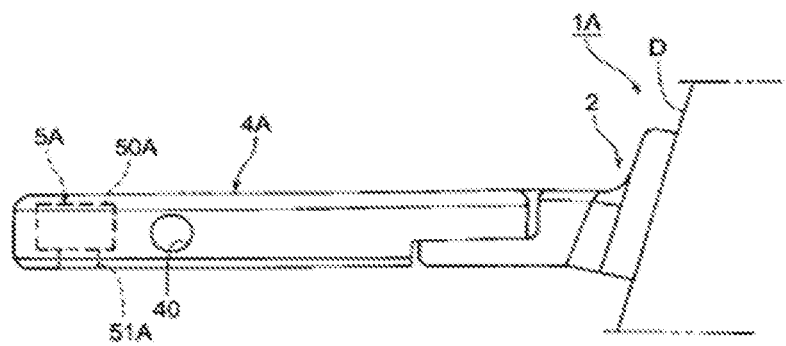
FIG. 17 is a front view (a front view corresponding to FIG. 2B) illustrating an electric retractable vehicle periphery viewing device according to a second embodiment of the present invention.

FIG. 17 illustrates an electric retractable vehicle periphery viewing device according to a second embodiment of the present invention. The electric retractable vehicle periphery viewing device according to the second embodiment will be herein described. In FIG. 17, the same reference numerals as in FIGS. 1 to 16 indicate the same components as those in FIGS. 1 to 16.

The electric retractable vehicle periphery viewing device 1 according to the aforementioned first embodiment is an imaging device as the viewing unit 5 of the viewing assembly 4 to capture images of information on the back side and lateral side of the vehicle V. Compared with the electric retractable vehicle periphery viewing device 1 of the first embodiment, an electric retractable vehicle periphery viewing device 1A, according to the second embodiment is structured such that a viewing assembly 4A is additionally provided with a viewing unit 5A as an imaging device to capture an image on information on the lower side of the vehicle V. The additionally provided viewing unit 5A includes a body 50A, a lens 51A and a harness (not illustrated) in the same way as the viewing unit 5 of the aforementioned first embodiment, and the viewing unit 5A is connected via the image processing device to the display.

The electric retractable vehicle periphery viewing device 1A according to the second embodiment is configured as described above and thus can attain substantially the same effects as those of the electric retractable vehicle periphery viewing device 1 according to the first embodiment. In addition, the electric retractable vehicle periphery viewing device 1A according to the second embodiment can display the image, captured by the additionally provided viewing unit 5A, of the information on the lower side of the vehicle V on the display. Consequently, the visible area can be expanded to the lower side of the vehicle V, and thus the electric retractable vehicle periphery viewing device 1A can contribute to traffic safety.

Moreover, the amount of protrusion outward from the door D of the electric retractable vehicle periphery viewing device 1A according to the second embodiment is large by the additionally provided viewing unit 5A compared with the amount of protrusion outward from the door D of the electric retractable vehicle periphery viewing device 1 according to the first embodiment.

(Description of Third Embodiment)

Figure 18:
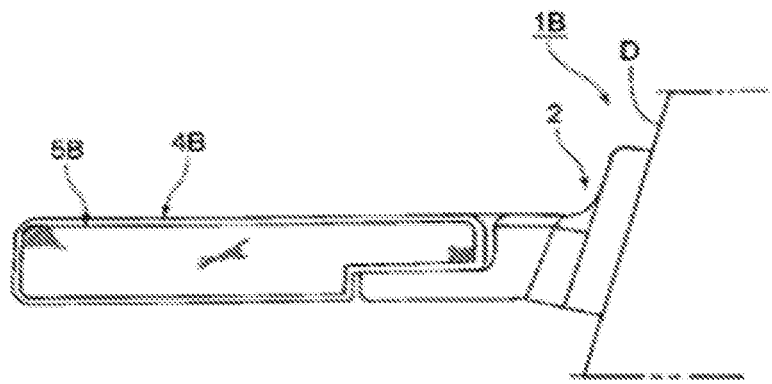
FIG. 18 is a front view (a front view corresponding to FIG. 2B) illustrating an electric retractable vehicle periphery viewing device according to a third embodiment of the present invention.

FIG. 18 illustrates an electric retractable vehicle periphery viewing device, according to a third embodiment of the present invention. The electric retractable vehicle periphery viewing device, according to the third embodiment will be herein described. In FIG. 18, the same reference numerals as in FIGS. 1 to 17 indicate the same components as those in FIGS. 1 to 17.

The electric retractable vehicle periphery viewing device 1, 1A according to the aforementioned first and second embodiments is an imaging device as the viewing unit 5, 5A of the viewing assembly 4, 4A to capture images of information on the back side and lateral side and the lower side of the vehicle V. Compared with the electric retractable vehicle periphery viewing device 1, 1A an electric retractable vehicle periphery viewing device 1B, according to the third embodiment uses a mirror, the length in the up-down direction of which is small, as a viewing unit 5B of a viewing assembly 4B.

The electric retractable vehicle periphery viewing device 1B according to the third embodiment is configured as described above and thus can attain substantially the same effects as those of the electric retractable vehicle periphery viewing device 1, 1A according to the first and second embodiments. In addition, the electric retractable vehicle periphery viewing device 1B according to the third embodiment is structured such that a mirror surface of the mirror of the viewing unit 5B to be used is appropriately set, and thus the electric retractable vehicle periphery viewing device 1B can visually recognize the back side and the lateral side and the lower side of the vehicle V.

(Description of Examples Other Than First to Third Embodiments)

Note that the present invention is not limited by the aforementioned first to third embodiments.

DESCRIPTION OF REFERENCE NUMERALS 1, 1A, 1B: Viewing device (electric retractable vehicle periphery viewing device)
2: Base
20: Neck portion
21: First fixation portion
22: Second fixation portion
23: Through-hole
24: Boss
25: Screw
3: Shaft
30: Shaft portion
31: Disk portion
32: Engagement portion
33: Locking groove
34: Rotation restriction projection
35: Positioning projection (positioning portion)
36: Boss
4, 4A, 4B: Viewing assembly
4U: Upper housing
4D: Lower housing
40: Through-hole
41: Opening
42: Through-hole
43: Boss
44, 45: Screw
4M: Electric retractable vehicle image display
5, 5A, 5B: Viewing unit
50, 50A: Body
51, 51A: Lens
52: Harness
53: Connector
54: Image processing device
55, 56: Signal line
57: Detector
5M: Display
6: Electric retracting unit
6U: Upper casing
6D: Lower casing
60: Screw
61: Bush
62: Stopper
63: Fixation projection
64: Positioning projection (positioning portion)
65: Elastic deformation portion
60U: Through-hole 61U: First cylindrical portion
62U: Second cylindrical portion
63U: First bearing portion
64U: Second bearing portion
60D: Screw hole
61D: Through-hole
62D: Cylindrical portion
63D: First bearing portion
64D: Second bearing portion
65D: Third bearing portion
66D: Engagement hole
67D: Connector portion
68D: Rotation restriction projection
69D: Cut portion
7: Speed reduction mechanism
70: Joint
71: First worm gear
72: Second worm gear
73: Helical gear
74: Idle gear
7M: Motor
70M: Switch circuit
71M: Terminal
8: Clutch mechanism
80: Clutch shaft
800: Flange
801: Recess
802: Shaft portion
803: Engagement portion
804: Locking groove
81: First clutch gear (first clutch)
810: Notch recess
82: Second clutch gear (second clutch)
820: Notch projection
83: Washer
84: Clutch spring
85: E-ring
9: Rotational force transmission mechanism
90: Washer
91: Lift gear (first lift member)
910: Anti-backlash recess
92: Lift holder (second lift member)
920: Anti-backlash projection
93: E-ring
A: Use position
B: Backward retracted position
C: Forward retracted position
D: Door (vehicle body)
E: Back side of vehicle V
F: Front side of vehicle V
G: Rotation direction
M: Outside mirror device
O: Rotation center line (rotation center line of viewing assembly 4, center line of shaft portion 30 of shaft 3)
O1: Axial center line (center line of clutch shaft 80)
T: Length
V: Vehicle

The invention claimed is:

1. An electric retractable vehicle periphery viewing device, comprising:
a base fixed to a vehicle body;
a shaft fixed to the base; and
a viewing assembly rotatably attached to the shaft;
wherein the viewing assembly includes:
a housing;
a viewing unit mounted in the housing; and
an electric retracting unit housed in the housing and configured to rotate the viewing assembly,
wherein the electric retracting unit includes:
the shaft;
a casing rotatably attached to the shaft and fixed to the housing;
a motor and a speed reduction mechanism that are attached to the casing;
a clutch mechanism attached to the casing, the clutch mechanism being in a connected state when the electric retractable vehicle periphery viewing device is in a normal case, to transmit a rotational force of the motor via the speed reduction mechanism to the casing, the clutch mechanism being in a disconnected state when force greater than the rotational force transmitted from the motor is applied to the viewing assembly, to rotate the viewing assembly without transmitting, to the speed reduction mechanism, the force greater than rotational force transmitted from the motor; and
a rotational force transmission mechanism attached to the shaft and configured to transmit rotational force of the motor via the speed reduction mechanism and the clutch mechanism to the casing and to rotate the viewing assembly between a use position and a backward retracted position,
wherein the motor, the speed reduction mechanism, a portion of the clutch mechanism, and the rotational force transmission mechanism are housed in the casing, and
wherein the motor, the speed reduction mechanism, the clutch mechanism, and the rotational force transmission mechanism are disposed in a direction substantially orthogonal with an axial direction of the shaft such that a length of the viewing assembly in the axial direction of the shaft can be reduced.

2. An electric retractable vehicle periphery viewing device, comprising:
a base fixed to a vehicle body;
a shaft fixed to the base; and
a viewing assembly rotatably attached to the shaft;
wherein the viewing assembly includes:
a housing;
a viewing unit mounted in the housing; and
an electric retracting unit housed in the housing and configured to rotate the viewing assembly,
wherein the electric retracting unit includes:
the shaft;
a casing rotatably attached to the shaft and fixed to the housing;
a motor and a speed reduction mechanism that are attached to the casing;
a clutch mechanism attached to the casing, the clutch mechanism being in a connected state when the electric retractable vehicle periphery viewing device is in a normal case, to transmit a rotational force of the motor via the speed reduction mechanism to the casing, the clutch mechanism being in a disconnected state when force greater than the rotational force transmitted from the motor is applied to the viewing assembly, to rotate the viewing assembly without transmitting, to the speed reduction mechanism, the force greater than rotational force transmitted from the motor; and
a rotational force transmission mechanism attached to the shaft and configured to transmit rotational force of the motor via the speed reduction mechanism and the clutch mechanism to the casing and to rotate the viewing assembly between a use position and a backward retracted position, wherein the motor, the speed reduction mechanism, a portion of the clutch mechanism, and the rotational force transmission mechanism are housed in the casing, and wherein the motor, the speed reduction mechanism, the clutch mechanism, and the rotational force transmission mechanism are disposed in a direction intersecting with an axial direction of the shaft, wherein the rotational force transmission mechanism includes:
- a first lift member rotatably attached to the shaft;
- a second lift member attached, to the shaft, not rotatably but movably in the axial direction of the shaft; and
- anti-backlash portions respectively disposed on the first lift member and the second lift member, the anti-backlash portions configured to, when the viewing assembly is located at the use position or the backward retracted position, disperse force in a rotation direction due to the rotational force of the motor applied to the first lift member, toward the axial direction of the shaft and the rotation direction, and to stop backlash in the axial direction of the shaft and backlash in the rotation direction.

3. The electric retractable vehicle periphery viewing device according to claim 1, wherein
- a stopper formed of a plate spring is fixed near the shaft in the casing,
- each of the shaft and the stopper is provided with a positioning portion thereof, when the viewing assembly rotated from the backward retracted position is located at the use position, the positioning portion makes contact with each other and stop the viewing assembly at the use position, and
- when the viewing assembly is rotated forward from the use position, the positioning portion of the stopper is deformed in the axial direction of the shaft to be disconnected from the positioning portion of the shaft and allows the viewing assembly to rotate forward.

4. An electric retractable vehicle periphery viewing device, comprising:
- a base fixed to a vehicle body;
- a shaft fixed to the base; and
- a viewing assembly rotatably attached to the shaft;

wherein the viewing assembly includes:
- a housing;
- a viewing unit mounted in the housing; and
- an electric retracting unit housed in the housing and configured to rotate the viewing assembly, wherein the electric retracting unit includes:
- the shaft;
- a casing rotatably attached to the shaft and fixed to the housing;
- a motor and a speed reduction mechanism that are attached to the casing;
- a clutch mechanism attached to the casing, the clutch mechanism being in a connected state when the electric retractable vehicle periphery viewing device is in a normal case, to transmit a rotational force of the motor via the speed reduction mechanism to the casing, the clutch mechanism being in a disconnected state when force greater than the rotational force transmitted from the motor is applied to the viewing assembly, to rotate the viewing assembly without transmitting, to the speed reduction mechanism, the force greater than rotational force transmitted from the motor; and
- a rotational force transmission mechanism attached to the shaft and configured to transmit rotational force of the motor via the speed reduction mechanism and the clutch mechanism to the casing and to rotate the viewing assembly between a use position and a backward retracted position, wherein the motor, the speed reduction mechanism, a portion of the clutch mechanism, and the rotational force transmission mechanism are housed in the casing, and wherein the motor, the speed reduction mechanism, the clutch mechanism, and the rotational force transmission mechanism are disposed in a direction intersecting with an axial direction of the shaft, wherein the clutch mechanism includes:
- a clutch shaft having a center line parallel to the shaft, the clutch shaft being attached, to the casing, not rotatably around the center line but movably in a direction of the center line;
- a clutch spring, outside the casing, attached to the clutch shaft and the casing; and
- a first clutch and a second clutch that are attached to the clutch shaft, the first clutch and the second clutch being in a connected state by spring force of the clutch spring when the electric retractable vehicle periphery viewing device is in a normal case, the first clutch and the second clutch being in a disconnected state against spring force of the clutch spring when an external force greater than rotational force transmitted from the motor is applied to the viewing assembly.

5. The electric retractable vehicle periphery viewing device according to claim 1, wherein the viewing unit is an imaging device configured to capture an image around a vehicle.

6. The electric retractable vehicle periphery viewing device according to claim 5, further comprising a display mounted in a vehicle and configured to display an image, captured by the imaging device, around a vehicle.

* * * * *